United States Patent
Chen et al.

(10) Patent No.: US 7,155,236 B2
(45) Date of Patent: Dec. 26, 2006

(54) SCHEDULED AND AUTONOMOUS TRANSMISSION AND ACKNOWLEDGEMENT

(75) Inventors: Tao Chen, San Diego, CA (US); Edward G. Tiedemann, Jr., Concord, MA (US); Avinash Jain, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 231 days.

(21) Appl. No.: 10/646,955

(22) Filed: Aug. 21, 2003

(65) Prior Publication Data

US 2004/0162083 A1 Aug. 19, 2004

Related U.S. Application Data

(60) Provisional application No. 60/470,770, filed on May 14, 2003, provisional application No. 60/452,790, filed on Mar. 6, 2003, provisional application No. 60/448,269, filed on Feb. 18, 2003.

(51) Int. Cl.
*H04Q 7/20* (2006.01)

(52) U.S. Cl. .................. 455/454; 455/524; 455/456.3; 455/514; 455/84; 455/73; 370/329; 370/340; 370/230; 370/230.1; 370/277; 370/278; 370/341; 370/321; 370/320; 370/335; 370/395.41; 370/441

(58) Field of Classification Search ................ 320/328, 320/340, 229, 230, 230.1, 222, 228, 341, 320/321, 320, 335, 325.41, 441; 455/454, 455/524, 514, 84, 23
See application file for complete search history.

(56) References Cited

U.S. PATENT DOCUMENTS

| 5,754,537 A | * | 5/1998 | Jamal ......................... 370/330 |
| 5,914,950 A | | 6/1999 | Tiedemann, Jr. et al. |
| 2002/0172217 A1 | | 11/2002 | Kadaba et al. |

* cited by examiner

*Primary Examiner*—Joseph Feild
*Assistant Examiner*—David Q. Nguyen
(74) *Attorney, Agent, or Firm*—Philip R. Wadsworth; Thien T. Nguyen; W. Chris Kim

(57) ABSTRACT

Techniques for efficient signaling to and from a plurality of mobile stations are disclosed. In one embodiment, a subset of mobile stations may be allocated a portion of the shared resource with one or more individual access grants, another subset may be allocated a portion of the shared resource with a single common grant, and yet another subset may be allowed to use a portion of the shared resource without any grant. In another embodiment, an acknowledge and continue command is used to extend all or a subset of the previous grants without the need for additional requests and grants, and their associated overhead. In one embodiment, a traffic to pilot ratio (T/P) is used to allocate a portion of the shared resource, allowing a mobile station flexibility in selecting its transmission format based on T/P.

23 Claims, 17 Drawing Sheets

ACK-and-Continue, 5 ms, 4 ARQ Channels

Common Grant Example - Common Grant (GCH$_0$) repeated over 20 ms Valid for 20 ms, 5 ms, 4 ARQ Channels Re-transmission Has Priority over Schedule
5 ms, 4 ARQ Channels Missed Grant

SCHEDULED AND AUTONOMOUS TRANSMISSION AND ACKNOWLEDGEMENT

This application is a non-provisional application claiming priority to provisional application Ser. No. 60/448,269, entitled "Reverse Link Data Communication", filed on Feb. 18, 2003; U.S. provisional application Ser. No. 60/452,790, entitled "Method and Apparatus for a Reverse Link Communication in a Communication System", filed on Mar. 6, 2003; and U.S. provisional application Ser. No. 60/470,770, entitled "Outer-Loop Power Control for Rel. D", filed on May 14, 2003.

FIELD

The present invention relates generally to wireless communications, and more specifically to a novel and improved method and apparatus for scheduled and autonomous transmission and acknowledgement.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as power control and soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from the mobile station, very fast scheduling, and scheduling for services that have more relaxed delay requirements. An example of such a data-only communication system using these techniques is the high data rate (HDR) system that conforms to the TIA/EIA/IS-856 standard (the IS-856 standard).

In contrast to the other above named standards, an IS-856 system uses the entire spectrum available in each cell to transmit data to a single user at one time, selected based on link quality. In so doing, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1xEV-DV", submitted to 3GPP2 as document number C50-20010820-012, Aug. 20, 2001. These, and related documents generated subsequently, such as Revision C of the IS-2000 standard, including C.S0001.C through C.S0006.C, are hereinafter referred to as the 1xEV-DV proposal.

In order to coordinate usage of the forward and reverse link in an efficient manner, a system, such as the 1xEV-DV proposal, for example, may need various signaling mechanisms for controlling transmission between one or more base stations and one or more mobile stations. For example, mobile stations may need a mechanism to coordinate their data transmissions on the reverse link. Mobile stations will be, in general, scattered throughout a cell's coverage area, and will need varying amounts of transmission power by the base station for communicating signals or commands effectively on the forward link as well as by the mobile station for transmitting data on the reverse link. A relatively distant, or low geometry, mobile station may require higher power forward link commands as well as higher power reverse link transmission than a relatively close, or high geometry, mobile station. In either case, signaling to coordinate access of a shared resource uses a portion of the shared resource, and thus reduces overall capacity. Examples of such signaling include access requests, access grants, and acknowledgements of received data transmissions.

As is well known in wireless system design, when a channel can be transmitted using less power for the same reliability, the capacity of the system may be improved. Furthermore, reducing the amount of coordination overhead while keeping a shared resource, such as a communication link, fully loaded will also improve capacity. There is therefore a need in the art for efficient transmission scheduling and coordination as well as reducing system loading allocated to such coordination.

SUMMARY

Embodiments disclosed herein address the need for efficient signaling to and from a plurality of mobile stations. In one embodiment, a subset of mobile stations may be allocated a portion of the shared resource with one or more individual access grants, another subset may be allocated a portion of the shared resource with a single common grant, and yet another subset may be allowed to use a portion of the shared resource without any grant. In another embodiment, an acknowledge and continue command is used to extend all or a subset of the previous grants without the need for additional requests and grants, and their associated overhead. In one embodiment, a traffic to pilot ratio (T/P) is used to allocate a portion of the shared resource, allowing a mobile station flexibility in selecting its transmission format based on T/P. Various other aspects are also presented. These aspects have the benefit of providing efficient utilization of the reverse link capacity, accommodating varying requirements such as low-latency, high throughput or differing quality of service, and reducing forward and reverse link overhead for providing these benefits, thus avoiding excessive interference and increasing capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
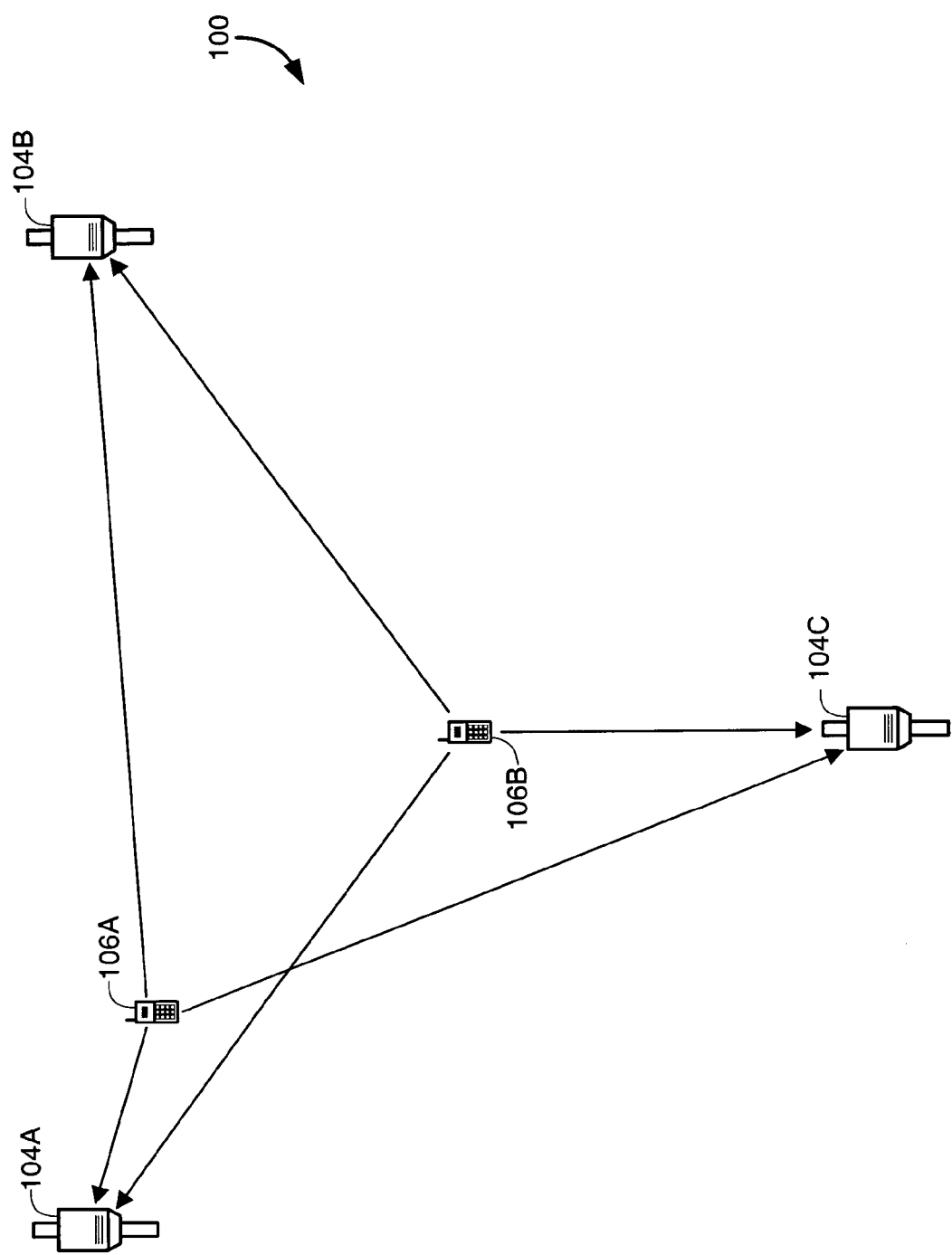
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV proposal). In an alternative embodiment, system 100 may additionally support any wireless standard or design other than a CDMA system. In the exemplary embodiment, system 100 is a 1xEV-DV system.

For simplicity, system 100 is shown to include three base stations 104 in communication with two mobile stations 106. The base station and its coverage area are often collectively referred to as a "cell". In IS-95, cdma2000, or 1xEV-DV systems, for example, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

While the various embodiments described herein are directed to providing reverse-link or forward-link signals for supporting reverse link transmission, and some may be well suited to the nature of reverse link transmission, those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

1xEV-DV Forward Link Data Transmission and Reverse Link Power Control

A system 100, such as the one described in the 1xEV-DV proposal, generally comprises forward link channels of four classes: overhead channels, dynamically varying IS-95 and IS-2000 channels, a Forward Packet Data Channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH may be used for data services that are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate that is supportable depends primarily upon the available power and Walsh codes after the power and Walsh codes for the overhead, IS-95, and IS-2000 channels have been assigned. The data transmitted on the F-PDCH is spread using one or more Walsh codes.

In the 1xEV-DV proposal, the base station generally transmits to one mobile station on the F-PDCH at a time, although many users may be using packet services in a cell. (It is also possible to transmit to two or more users, by scheduling transmissions for the two or more users and allocating power and/or Walsh channels to each user appropriately.) Mobile stations are selected for forward link transmission based upon some scheduling algorithm.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission that supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel or R-CQICH. The scheduling algorithm is used to determine the mobile station selected for transmission, as well as the appropriate rate and transmission format in accordance with the channel quality.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1xEV-DV system is an example of a system that divides the communication resource between both types of access, and dynamically allocates the apportionment according to user demand. Following is a brief background on how the communication resource can be allocated to accommodate various users in both types of access systems. Power control is described for simultaneous access by multiple users, such as IS-95 type channels. Rate determination and scheduling is discussed for time-shared access by multiple users, such as an IS-856 system or the data-only portion of a 1xEV-DV type system (i.e., the F-PDCH).

Capacity in a system such as an IS-95 CDMA system is determined in part by interference generated in transmitting signals to and from various users within the system. A feature of a typical CDMA system is to encode and modulate signals for transmission to or from a mobile station such that the signals are seen as interference by other mobile stations. For example, on the forward link, the quality of the channel between a base station and one mobile station is determined in part by other user interference. To maintain a desired performance level of communication with the mobile station, the transmit power dedicated to that mobile station must be sufficient to overcome the power transmitted to the other mobile stations served by the base station, as well as other disturbances and degradation experienced in that channel. Thus, to increase capacity, it is desirable to transmit the minimum power required to each mobile station served.

In a typical CDMA system, when multiple mobile stations are transmitting to a base station, it is desirable to receive a plurality of mobile station signals at the base station at a normalized power level. Thus, for example, a reverse link power control system may regulate the transmit power from each mobile station such that signals from nearby mobile stations do not overpower signals from farther away mobile stations. As with the forward link, keeping the transmit power of each mobile station at the minimum power level required to maintain the desired performance level allows for capacity to be optimized, in addition to other benefits of power savings such as increased talk and standby times, reduced battery requirements, and the like.

Capacity in a typical CDMA system, such as IS-95, is constrained by, among other things, other-user interference. Other-user interference can be mitigated through use of power control. The overall performance of the system, including capacity, voice quality, data transmission rates and throughput, is dependant upon stations transmitting at the lowest power level to sustain the desired level of performance whenever possible. To accomplish this, various power control techniques are known in the art.

One class of techniques includes closed loop power control. For example, closed loop power control may be deployed on the forward link. Such systems may employ an inner and outer power control loop in the mobile station. An outer loop determines a target received power level according to a desired received error rate. For example, a target frame error rate of 1% may be pre-determined as the desired error rate. The outer loop may update the target received power level at a relatively slow rate, such as once per frame or block. In response, the inner loop then sends up or down power control messages to the base station until received power meets the target. These inner loop power control commands occur relatively frequently, so as to quickly adapt the transmitted power to the level necessary to achieve the desired received signal to noise and interference ratio for efficient communication. As described above, keeping the forward link transmit power for each mobile station at the lowest level reduces other user interference seen at each mobile station and allows remaining available transmit power to be reserved for other purposes. In a system such as IS-95, the remaining available transmit power can be used to support communication with additional users. In a system such as 1xEV-DV, the remaining available transmit power can be used to support additional users, or to increase the throughput of the data-only portion of the system.

In a "data-only" system, such as IS-856, or in the "data-only" portion of a system, such as 1xEV-DV, a control loop may be deployed to govern the transmission from the base station to a mobile station in a time-shared manner. For clarity, in the following discussion, transmission to one mobile station at a time may be described. This is to distinguish from a simultaneous access system, an example of which is IS-95, or various channels in a cdma200 or 1xEV-DV system. Two notes are in order at this point.

First, the term "data-only" or "data channel" may be used to distinguish a channel from IS-95 type voice or data channels (i.e. simultaneous access channels using power control, as described above) for clarity of discussion only. It will be apparent to those of skill in the art that data-only or data channels described herein can be used to transmit data of any type, including voice (e.g., voice over Internet Protocol, or VoIP). The usefulness of any particular embodiment for a particular type of data may be determined in part by the throughput requirements, latency requirements, and the like. Those of skill in the art will readily adapt various embodiments, combining either access type with parameters selected to provide the desired levels of latency, throughput, quality of service, and the like.

Second, a data-only portion of a system, such as that described for 1xEV-DV, which is described as time-sharing the communication resource, can be adapted to provide access on the forward link to more than one user simultaneously. In examples herein where the communication resource is described as time-shared to provide communication with one mobile station or user during a certain period, those of skill in the art will readily adapt those examples to allow for time-shared transmission to or from more than one mobile station or user within that time period.

A typical data communication system may include one or more channels of various types. More specifically, one or more data channels are commonly deployed. It is also common for one or more control channels to be deployed, although in-band control signaling can be included on a data channel. For example, in a 1xEV-DV system, a Forward Packet Data Control Channel (F-PDCCH) and a Forward Packet Data Channel (F-PDCH) are defined for transmission of control and data, respectively, on the forward link.

Figure 2:
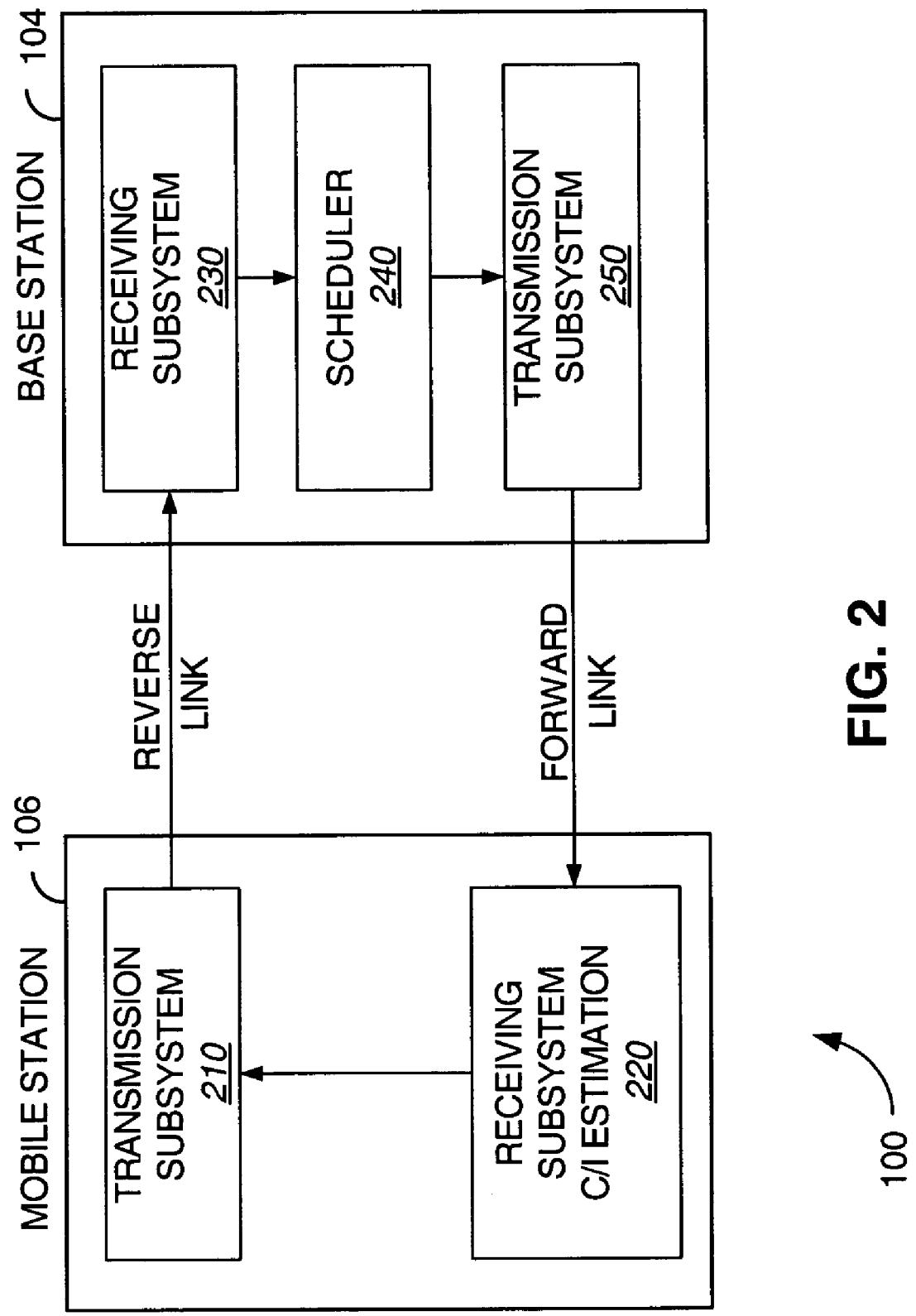
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station for the mobile station 106. An example receiving subsystem is detailed further below with respect to FIG. 3. A Carrier-to-Interference (C/I) estimate is made for the forward link signal received from the serving base station in the mobile station 106. A C/I measurement is an example of a channel quality metric used as a channel estimate, and alternate channel quality metrics can be deployed in alternate embodiments. The C/I measurement is delivered to transmission subsystem 210 in the base station 104, an example of which is detailed further below with respect to FIG. 3.

The transmission subsystem 210 delivers the C/I estimate over the reverse link where it is delivered to the serving base station. Note that, in a soft handoff situation, well known in the art, the reverse link signals transmitted from a mobile station may be received by one or more base stations other than the serving base station, referred to herein as non-serving base stations. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm can be deployed within the scope of the present invention. One example is disclosed in U.S. Pat. No. 6,335,922 issued on Jan. 1, 2002, entitled "METHOD AND APPARATUS FOR FORWARD LINK RATE SCHEDULING", assigned to the assignee of the present invention.

In an example 1xEV-DV embodiment, a mobile station is selected for forward link transmission when the C/I measurement received from that mobile station indicates that data can be transmitted at a certain rate. It is advantageous, in terms of system capacity, to select a target mobile station such that the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be that a mobile station, with a relatively lower reported C/I, is selected for transmission to maintain a minimum data transfer rate to that user.

In the example 1xEV-DV system, scheduler 240 determines which mobile station to transmit to, and also the data rate, modulation format, and power level for that transmission. In an alternate embodiment, such as an IS-856 system, for example, a supportable rate/modulation format decision can be made at the mobile station, based on channel quality measured at the mobile station, and the transmit format can be transmitted to the serving base station in lieu of the C/I measurement. Those of skill in the art will recognize myriad combinations of supportable rates, modulation formats, power levels, and the like which can be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 250 to transmit to the selected mobile station on the forward link using the selected rate, modulation format, power level, and the like.

In the example embodiment, messages on the control channel, or F-PDCCH, are transmitted along with data on the data channel, or F-PDCH. The control channel can be used to identify the recipient mobile station of the data on the F-PDCH, as well as identifying other communication parameters useful during the communication session. A mobile station should receive and demodulate data from the F-PDCH when the F-PDCCH indicates that mobile station is the target of the transmission. The mobile station responds on the reverse link following the receipt of such data with a message indicating the success or failure of the transmission. Retransmission techniques, well known in the art, are commonly deployed in data communication systems.

A mobile station may be in communication with more than one base station, a condition known as soft handoff. Soft handoff may include multiple sectors from one base station (or one Base Transceiver Subsystem (BTS)), known as softer handoff, as well as with sectors from multiple BTSs. Base station sectors in soft handoff are generally stored in a mobile station's Active Set. In a simultaneously shared communication resource system, such as IS-95, IS-2000, or the corresponding portion of a 1xEV-DV system, the mobile station may combine forward link signals transmitted from all the sectors in the Active Set. In a data-only system, such as IS-856, or the corresponding portion of a 1xEV-DV system, a mobile station receives a forward link data signal from one base station in the Active Set, the serving base station (determined according to a mobile station selection algorithm, such as those described in the C.S0002.C standard). Other forward link signals, examples of which are detailed further below, may also be received from non-serving base stations.

Reverse link signals from the mobile station may be received at multiple base stations, and the quality of the reverse link is generally maintained for the base stations in the active set. It is possible for reverse link signals received at multiple base stations to be combined. In general, soft combining reverse link signals from non-collocated base stations would require significant network communication bandwidth with very little delay, and so the example systems listed above do not support it. In softer handoff, reverse link signals received at multiple sectors in a single BTS can be combined without network signaling. While any type of reverse link signal combining may be deployed within the scope of the present invention, in the example systems described above, reverse link power control maintains quality such that reverse link frames are successfully decoded at one BTS (switching diversity).

In a simultaneously shared communication resource system, such as IS-95, IS-2000, or the corresponding portion of a 1xEV-DV system, each base station in soft handoff with a mobile station (i.e., in the mobile station's Active Set) measures the reverse link pilot quality of that mobile station and sends out a stream of power control commands. In IS-95 or IS-2000 Rev. B, each stream is punctured onto the Forward Fundamental Channel (F-FCH) or the Forward Dedicated Control Channel (F-DCCH), if either is assigned. The stream of commands for a mobile station is called the Forward Power Control Subchannel (F-PCSCH) for that mobile station. The mobile station receives the parallel command streams from all its Active Set members for each base station (multiple sectors from one BTS, if all in the Active Set of the mobile station, send the same command to that mobile station) and determines if an "up" or "down" command was sent. The mobile station modifies the reverse link transmit power level accordingly, using the "Or-of-downs" rule, that is, the transmit power level is reduced if any "down" command is received, and increased otherwise.

The transmit power level of the F-PCSCH is typically tied to the level of the host F-FCH or F-DCCH that carries the subchannel. The host F-FCH or F-DCCH transmit power level at the base station is determined by the feedback from the mobile station on the Reverse Power Control Subchannel (R-PCSCH), which occupies the last quarter of the Reverse Pilot Channel (R-PICH). Since the F-FCH or the F-DCCH from each base station forms a single stream of traffic channel frames, the R-PCSCH reports the combined decoding results of these legs. Erasures of the F-FCH or the F-DCCH determine the required Eb/Nt set point of the outer loop, which in turn drives the inner loop commands on the R-PCSCH and thus the base station transmit levels of the F-FCH, F-DCCH, as well as the F-PCSCH on them.

Due to the potential differences in reverse link path loss to each base station from a single mobile station in soft handoff, some of the base stations in the Active Set may not receive the R-PCSCH reliably and may not correctly control the forward link power of the F-FCH, F-DCCH, and the F-PCSCH. The base stations may need to re-align the transmit levels among themselves so that the mobile station retains the spatial diversity gain of soft handoff. Otherwise, some of the forward link legs may carry little or no traffic signal energy due to errors in the feedback from the mobile station.

Since different base stations may need different mobile station transmit power for the same reverse link set point or reception quality, the power control commands from different base stations may be different and cannot be soft combined at the MS. When new members are added to the Active Set (i.e. no soft handoff to 1-way soft handoff, or from 1-way to 2-way, etc.), the F-PCSCH transmit power is increased relative to its host F-FCH or F-DCCH. This may be because the latter has both more spatial diversity (less total Eb/Nt required) and load sharing (less energy per leg) while the former has none.

By contrast, in a 1xEV-DV system, the Forward Common Power Control Channel (F-CPCCH) transports the reverse link power control commands for mobile stations without the Forward Fundamental Channel (F-FCH) or the Forward Dedicated Control Channel (F-DCCH). In earlier versions of the 1xEV-DV proposal, it has been assumed that the base station transmit power level of the F-CPCCH is determined by the Reverse Channel Quality Indicator Channel (R-CQICH) received from the mobile station. The R-CQICH may be used in scheduling, to determine the appropriate forward link transmission format and rate in response to forward link channel quality measurements.

However, when the mobile station is in soft handoff, the R-CQICH only reports the forward link pilot quality of the serving base station sector and therefore cannot be used to directly power control the F-CPCCH from the non-serving base stations. Techniques for this are disclosed in U.S. Patent Application No. 60/356,929, entitled "Method and Apparatus for Forward Link Power Control During Soft Handoff in a Communication System", filed Feb. 12, 2002, assigned to the assignee of the present invention.

Example Base Station and Mobile Station Embodiments

Figure 3:
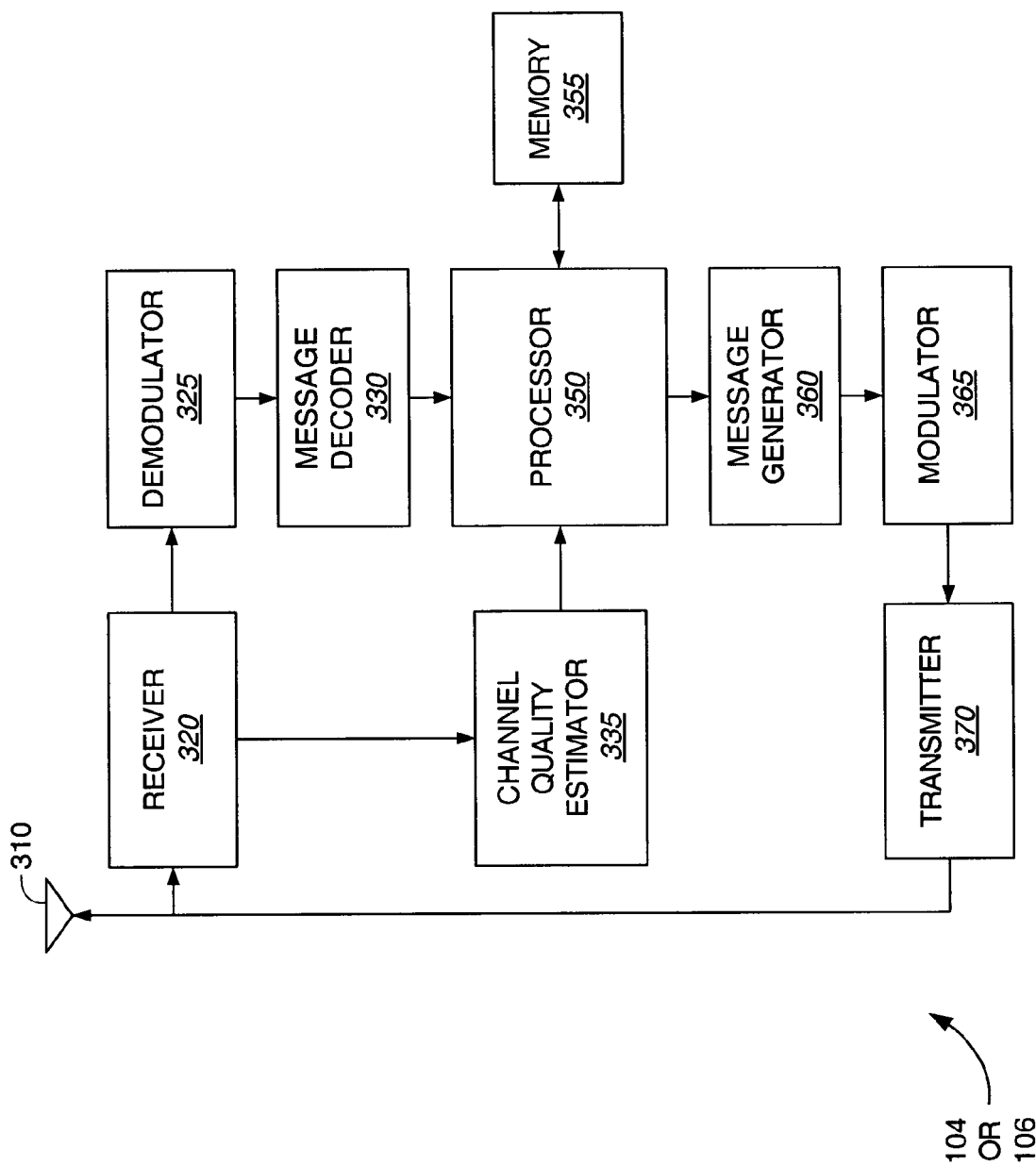
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1xEV-DV signals is deployed. In alternate embodiments, alternate standards may be supported, and embodiments may support multiple communication formats. Demodulator 330 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels that can be received and demodulated in receiver 320 and demodulator 325. Demodulation of the forward data channel will occur in accordance with signaling on the control channel, as described above.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, power control messages, or control channel messages used for demodulating the forward data channel. Various types of control messages may be decoded in either a base station 104 or mobile station 106 as transmitted on the reverse or forward links, respectively. For example, described below are request messages and grant messages for scheduling reverse link data transmission for generation in a mobile station or base station, respectively. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples). An example command signal, the Forward Common Acknowledgement Channel (F-CACKCH) is used to describe various embodiments below.

Channel quality estimator 335 is connected to receiver 320, and used for making various power level estimates for use in procedures described herein, as well as for use in various other processing used in communication, such as demodulation. In a mobile station 106, C/I measurements may be made. In addition, measurements of any signal or channel used in the system may be measured in the channel quality estimator 335 of a given embodiment. As described more fully below, power control channels are another example. In a base station 104 or mobile station 106, signal strength estimations, such as received pilot power can be made. Channel quality estimator 335 is shown as a discrete block for clarity of discussion only. It is common for such a block to be incorporated within another block, such as receiver 320 or demodulator 325. Various types of signal strength estimates can be made, depending on which signal or which system type is being estimated. In general, any type of channel quality metric estimation block can be deployed in place of channel quality estimator 335 within the scope of the present invention. In a base station 104, the channel quality estimates are delivered to processor 350 for use in scheduling, or determining the reverse link quality, as described further below. Channel quality estimates may be used to determine whether up or down power control commands are required to drive either the forward or reverse link power to the desired set point. The desired set point may be determined with an outer loop power control mechanism, as described above.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels can be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components which may be incorporated in modulator 365 include encoders, interleavers, spreaders, and modulators of various types. A reverse link design, including example modulation formats and access control, suitable for deployment on a 1xEV-DV system is also described below, Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively. For example, described below are request messages and grant messages for scheduling reverse link data transmission for generation in a mobile station or base station, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which can be used for storing data as well as instructions for performing the various procedures and methods described herein. Those of skill in the art will recognize that memory 355 may be comprised of one or more memory components of various types, that may be embedded in whole or in part within processor 350.

1xEV-DV Reverse Link Design Considerations

In this section, various factors considered in the design of an example embodiment of a reverse link of a wireless communication system are described. In many of the embodiments, detailed further in following sections, signals, parameters, and procedures associated with the 1xEV-DV standard are used. This standard is described for illustrative purposes only, as each of the aspects described herein, and combinations thereof, may be applied to any number of communication systems within the scope of the present invention. This section serves as a partial summary of various aspects of the invention, although it is not exhaustive. Example embodiments are detailed further in subsequent sections below, in which additional aspects are described.

In many cases, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resource involves several factors. One factor to consider is the mix of scheduled reverse link transmissions from various mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, mobile stations may be granted access at the highest rate they can support, and additional mobile stations may be granted access until capacity is reached. One factor a base station may consider in deciding which mobile stations to schedule is the maximum rate each mobile can support and the amount of data each mobile station has to send. A mobile station capable of higher throughput may be selected instead of an alternate mobile station whose channel does not support the higher throughput.

Another factor to be considered is the quality of service required by each mobile station. While it may be permissible to delay access to one mobile station in hopes that the channel will improve, opting instead to select a better situated mobile station, it may be that suboptimal mobile stations may need to be granted access to meet minimum quality of service guarantees. Thus, the data throughput scheduled may not be the absolute maximum, but rather maximized considering channel conditions, available mobile station transmit power, and service requirements. It is desirable for any configuration to reduce the signal to noise ratio for the selected mix.

Various scheduling mechanisms are described below for allowing a mobile station to transmit data on the reverse link. One class of reverse link transmission involves the mobile station making a request to transmit on the reverse link. The base station makes a determination of whether resources are available to accommodate the request. A grant can be made to allow the transmission. This handshake between the mobile station and the base station introduces a delay before the reverse link data can be transmitted. For certain classes of reverse link data, the delay may be acceptable. Other classes may be more delay-sensitive, and alternate techniques for reverse link transmission are detailed below to mitigate delay.

In addition, reverse link resources are expended to make a request for transmission, and forward link resources are expended to respond to the request, i.e. transmit a grant. When a mobile station's channel quality is low, i.e. low geometry or deep fading, the power required on the forward link to reach the mobile may be relatively high. Various techniques are detailed below to reduce the number or required transmit power of requests and grants required for reverse link data transmission.

To avoid the delay introduced by a request/grant handshake, as well as to conserve the forward and reverse link resources required to support them, an autonomous reverse link transmission mode is supported. A mobile station may transmit data at a limited rate on the reverse link without making a request or waiting for a grant.

The base station allocates a portion of the reverse link capacity to one or more mobile stations. A mobile station that is granted access is afforded a maximum power level. In the example embodiments described herein, the reverse link resource is allocated using a Traffic to Pilot (T/P) ratio. Since the pilot signal of each mobile station is adaptively controlled via power control, specifying the T/P ratio indicates the available power for use in transmitting data on the reverse link. The base station may make specific grants to one or more mobile stations, indicating a T/P value specific to each mobile station. The base station may also make a common grant to the remaining mobile stations which have requested access, indicating a maximum T/P value that is allowed for those remaining mobile stations to transmit. Autonomous and scheduled transmission, as well as individual and common grants, are detailed further below.

Various scheduling algorithms are known in the art, and more are yet to be developed, which can be used to determine the various specific and common T/P values for grants in accordance with the number of registered mobile stations, the probability of autonomous transmission by the mobile stations, the number and size of the outstanding requests, expected average response to grants, and any number of other factors. In one example, a selection is made based on QoS priority, efficiency, and the achievable throughput from the set of requesting mobile stations. One example scheduling technique is disclosed in co-pending U.S. Provisional Patent Application No. 60/439,989, entitled "SYSTEM AND METHOD FOR A TIME-SCALABLE PRIORITY-BASED SCHEDULER", filed Jan. 13, 2003, assigned to the assignee of the present invention. Additional references include U.S. Pat. No. 5,914,950, entitled "METHOD AND APPARATUS FOR REVERSE LINK RATE SCHEDULING", and U.S. Pat. No. 5,923,650, also entitled "METHOD AND APPARATUS FOR REVERSE LINK RATE SCHEDULING", both assigned to the assignee of the present invention.

A mobile station may transmit a packet of data using one or more subpackets, where each subpacket contains the complete packet information (each subpacket is not necessarily encoded identically, as various encoding or redundancy may be deployed throughout various subpackets). Retransmission techniques may be deployed to ensure reliable transmission, for example ARQ. Thus, if the first subpacket is received without error (using a CRC, for example), a positive Acknowledgement (ACK) is sent to the mobile station and no additional subpackets will be sent (recall that each subpacket comprises the entire packet information, in one form or another). If the first subpacket is not received correctly, then a Negative Acknowledgement signal (NAK) is sent to the mobile station, and the second subpacket will be transmitted. The base station can combine the energy of the two subpackets and attempt to decode. The process may be repeated indefinitely, although it is common to specify a maximum number of subpackets. In example embodiments described herein, up to four subpackets may be transmitted. Thus, the probability of correct reception increases as additional subpackets are received. (Note that a third response from a base station, ACK-and-Continue, is useful for reducing request/grant overhead. This option is detailed further below).

As just described, a mobile station may trade off throughput for latency in deciding whether to use autonomous transfer to transmit data with low latency or requesting a higher rate transfer and waiting for a common or specific grant. In addition, for a given T/P, the mobile station may select a data rate to suit latency or throughput. For example, a mobile station with relatively few bits for transmission may decide that low latency is desirable. For the available T/P (probably the autonomous transmission maximum in this example, but could also be the specific or common grant T/P), the mobile station may select a rate and modulation format such that the probability of the base station correctly receiving the first subpacket is high. Although retransmission will be available if necessary, it is likely that this mobile station will be able to transmit its data bits in one subpacket. In the example embodiments described herein, each subpacket is transmitted in 5 ms. Therefore, in this example, a mobile station may make an immediate autonomous transfer that is likely to be received at the base station following a 5 ms interval. Note that, alternatively, the mobile station may use the availability of additional subpackets to increase the amount of data transmitted for a given T/P. So, a mobile station may select autonomous transfer to reduce latency associated with requests and grants, and may additionally trade the throughput for a particular T/P to minimize the number of subpackets (hence latency) required. Even if the full number of subpackets is selected, autonomous transfer will be lower latency than request and grant for relatively small data transfers. Those of skill in the art will recognize that as the amount of data to be transmitted grows, requiring multiple packets for transmission, the overall latency may be reduced by switching to a request and grant format, since the penalty of the request and grant will eventually be offset by the increased throughput of a higher data rate across multiple packets. This process is detailed further below, with an example set of transmission rates and formats that can be associated with various T/P assignments.

Mobile stations in varying locations within the cell, and traveling at varying speeds will experience varying channel conditions. Power control is used to maintain reverse link signals. Pilot power received at base station may be power controlled to be approximately equal from various mobile stations. Then, as described above, the T/P ratio is an indicator of the amount of the communication resource used during reverse link transmission. It is desirable to maintain the proper balance between pilot and traffic, for a given mobile station transmit power, transmission rate, and modulation format.

Mobile stations may have a limited amount of transmit power available. Thus, for example, the communication rate may be limited by the maximum power of the mobile station power amplifier. Mobile station transmit power may also be governed by the base station to avoid excessive interference with other mobile stations, using power control and various data transmission scheduling techniques. The amount of available mobile station transmit power will be allocated to transmitting one or more pilot channels, one or more data channels, and any other associated control channels. To increase data throughput, the rate of transmission may be increased by reducing code rate, increasing the symbol rate, or using a higher order modulation scheme. To be effective, the associated pilot channel must be received reliably to provide a phase reference for demodulation. Thus, a portion of the available transmit power is allocated to the pilot, and increasing that portion will increase the reliability of pilot reception. However, increasing the portion of available transmit power allocated to the pilot also decreases the amount of power available for data transmission, and increasing the portion of available transmit power allocated to the data also increases demodulation reliability. An appropriate modulation format and transmission rate can be determined for a given T/P.

Due to variations in data transmission demand, and discontinuous allocation of the reverse link to mobile stations, the transmission rate for a mobile station may vary rapidly. The desired pilot power level for a transmission rate and format may thus change instantaneously, as just described. Without prior knowledge of rate changes (which may be expected in the absence of costly signaling or reduced flexibility in scheduling), a power control loop may attempt to counteract a sudden change in received power at the base station, perhaps interfering with the decoding of the beginning of the packet. Similarly, due to incremental step sizes commonly deployed in power control, it may take a relatively long time to reduce the pilot once the transmission rate and format have been reduced. One technique to combat these, and other phenomena (detailed further below), is to deploy a secondary pilot in addition to a primary pilot. The primary pilot can be used for power control and demodulation of all channels, including control channels and low rate data channels. When additional pilot power is needed for higher level modulation or increased data rate, additional pilot power may be transmitted on a secondary pilot. The power of the secondary pilot can be determined relative to the primary pilot and the incremental pilot power required for the selected transmission. The base station may receive both pilots, combine them, and use them to determine phase and magnitude information for demodulation of the traffic. Instantaneous increases or decreases in the secondary pilot do not interfere with power control.

Example embodiments, detailed further below, realize the benefits of a secondary pilot, as just described, by use of an already deployed communication channel. Thus, capacity is generally improved, since in part of the expected range of operation, the information transmitted on the communication channel requires little or no additional capacity than required to perform the pilot function. As is well known in the art, a pilot signal is useful for demodulation because it is a known sequence, and hence the phase and magnitude of the signal may be derived from the pilot sequence for demodulation. However, transmitting pilot without carrying data costs reverse link capacity. Hence, unknown data is modulated on the "secondary pilot", and thus the unknown sequence must be determined in order to extract information useful for demodulation of the traffic signal. In an example embodiment, the Reverse Rate Indication Channel (R-RICH) is used to provide the Reverse Rate Indicator (RRI), the rate associated with the transmission on the R-SCH. In addition, the R-RICH power is adjusted in accordance with the pilot power requirements, which can be used at the base station to provide a secondary pilot. That the RRI is one of a known set of values aids in determining the unknown component of the R-RICH channel. In an alternate embodiment, any channel may be modified to serve as a secondary pilot. This technique is detailed further below.

Reverse Link Data Transmission

The reverse link is generally quite different than the forward link. Following are several reasons: On the forward link, it takes additional power to transmit from multiple cells—on the reverse link, receiving from more cells reduces the required amount of transmit power. On the reverse link, there are always multiple antennas receiving the mobile station. This can mitigate some of the dramatic fading as often occurs on the forward link.

When the mobile station is in a boundary area between multiple cells, the forward link Ec/Io will dramatically change due to the fading of the other cells. On the reverse link, the change in interference is not as dramatic, since any change is due to a variation in the sum of the received power of all mobile stations that are transmitting on the reverse link all of which are all power controlled.

The mobile station is power limited on the reverse link. Thus, the mobile station may be unable to transmit at a very high rate from time to time, depending on channel conditions.

The mobile station may not be able to receive the forward link from the base station that received the mobile station's reverse link transmission. As a result, if the mobile station relies upon the transmission of signaling, for example, an acknowledgement, from a single base station, then that signalling reliability may be low.

One goal of a reverse link design is to maintain the Rise-over-Thermal (RoT) at the base station relatively constant as long as there is reverse link data to be transmitted. Transmission on the reverse link data channel is handled in two different modes:

Autonomous Transmission: This case is used for traffic requiring low delay. The mobile station is allowed to transmit immediately, up to a certain transmission rate, determined by the serving base station (i.e. the base station to which the mobile station directs its Channel Quality Indicator (CQI). A serving base station is also referred to as a scheduling base station or a granting base station. The maximum allowed transmission rate for autonomous transmission can be signaled by the serving base station dynamically based on system load, congestion, etc.

Scheduled Transmission: The mobile station sends an estimate of its buffer size, available power, and other parameters. The base station determines when the mobile station is allowed to transmit. The goal of a scheduler is to limit the number of simultaneous transmissions, thus reducing the interference between mobile stations. The scheduler may attempt to have mobile stations in regions between cells transmit at lower rates so as to reduce interference to neighboring cells, and to tightly control RoT to protect the voice quality on the R-FCH, the DV feedback on R-CQICH and the acknowledgments (R-ACKCH), as well as the stability of the system.

Various embodiments, detailed herein, contain one or more features designed to improve throughput, capacity, and overall system performance of the reverse link of a wireless communication system. For illustrative purposes only, the data portion of a 1xEV-DV system, in particular, optimization of transmission by various mobile stations on the Enhanced Reverse Supplemental Channel (R-ESCH), is described. Various forward and reverse link channels used in one or more of the example embodiments are detailed in this section. These channels are generally a subset of the channels used in a communication system.

Figure 4:
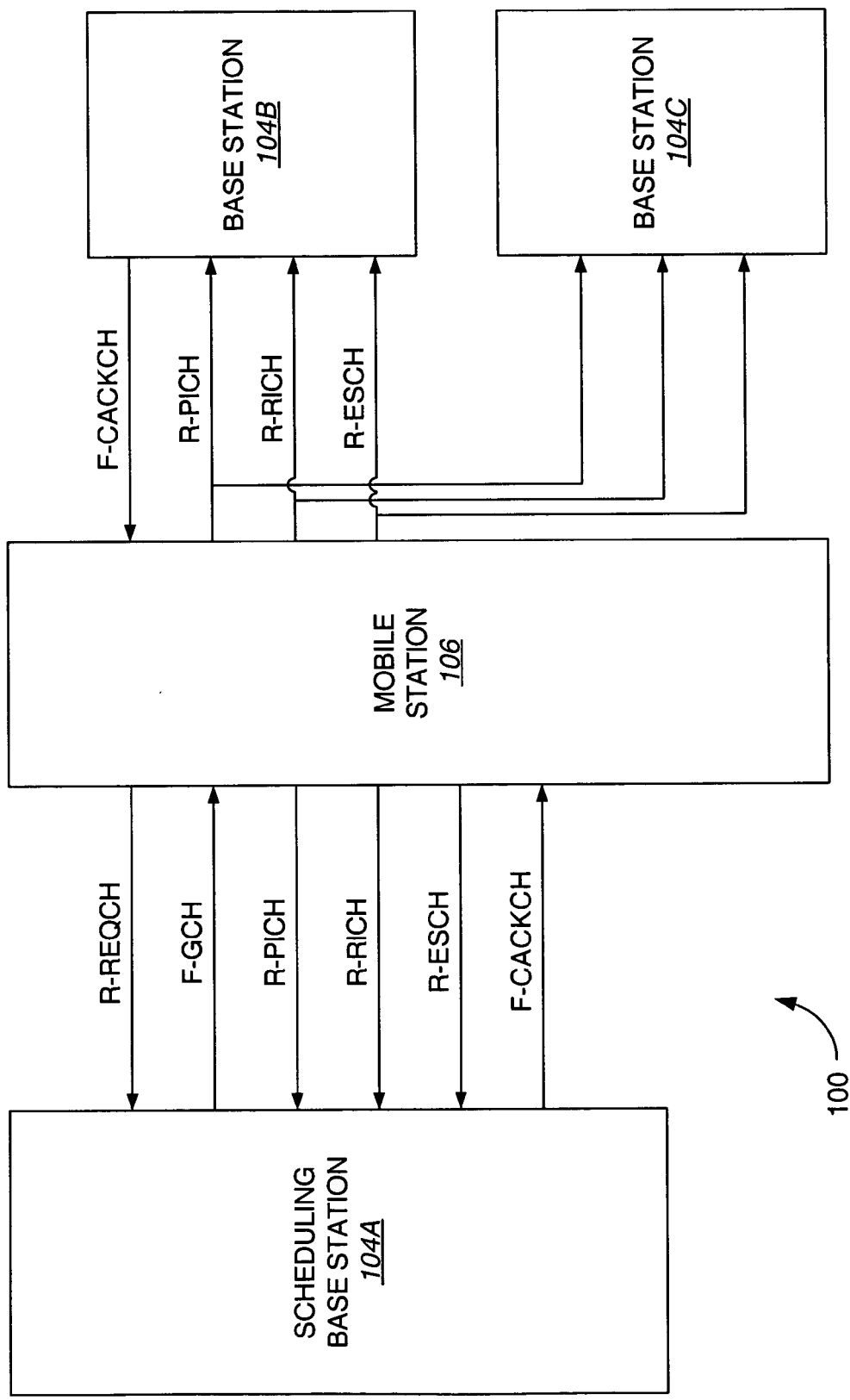
FIG. 4 depicts an exemplary embodiment of data and control signals for reverse link data communication.

FIG. 4 depicts an exemplary embodiment of data and control signals for reverse link data communication. A mobile station 106 is shown communicating over various channels, each channel connected to one or more base stations 104A–104C. Base station 104A is labeled as the scheduling base station. The other base stations 104B and 104C are part of the Active Set of mobile station 106. There are four types of reverse link signals and two types of forward link signals shown. They are described below.

R-REQCH

The Reverse Request Channel (R-REQCH) is used by the mobile station to request from the scheduling base station a reverse link transmission of data. In the example embodiment, requests are for transmission on the R-ESCH (detailed further below). In the example embodiment, a request on the R-REQCH includes the T/P ratio the mobile station can support, variable according to changing channel conditions, and the buffer size (i.e. the amount of data awaiting transmission). The request may also specify the Quality of Service (QoS) for the data awaiting transmission. Note that a mobile station may have a single QoS level specified for the mobile station, or, alternately, different QoS levels for different types of data. Higher layer protocols may indicate the QoS, or other desired parameters (such as latency or throughput requirements) for various data services. In an alternative embodiment, a Reverse Dedicated Control Channel (R-DCCH), used in conjunction with other reverse link signals, such as the Reverse Fundamental Channel (R-FCH) (used for voice services, for example), may be used to carry access requests. In general, access requests may be described as comprising a logical channel, i.e. a Reverse Schedule Request Channel (R-SRCH), which may be mapped onto any existing physical channel, such as the R-DCCH. The example embodiment is backward compatible with existing CDMA systems such as cdma2000, and the R-REQCH is a physical channel that can be deployed in the absence of either the R-FCH or the R-DCCH. For clarity, the term R-REQCH is used to describe the access request channel in embodiment descriptions herein, although those of skill in the art will readily extend the principles to any type of access request system, whether the access request channel is logical or physical. The R-REQCH may be gated off until a request is needed, thus reducing interference and conserving system capacity.

In the example embodiment, the R-REQCH has 12 input bits, that consist of the following: 4 bits to specify the maximum R-ESCH T/P ratio that the mobile can support, 4 bits to specify the amount of data in the mobile's buffer, and 4 bits to specify the QoS. Those of skill in the art will recognize that any number of bits and various other fields may be included in alternate embodiments.

F-GCH

The Forward Grant Channel (F-GCH) is transmitted from the scheduling base station to the mobile station. The F-GCH may be comprised of multiple channels. In the example embodiment, a common F-GCH channel is deployed for making common grants, and one or more individual F-GCH channels are deployed for making individual grants. Grants are made by the scheduling base station in response to one or more requests from one or more mobile stations on their respective R-REQCHs. Grant channels may be labeled as $GCH_x$, where the subscript x identifies the channel number. A channel number 0 may be used to indicate the common grant channel. If N individual channels are deployed, the subscript x may range from 1 to N.

An individual grant may be made to one or more mobile stations, each of which gives permission to the identified mobile station to transmit on the R-ESCH at a specified T/P ratio or below. Making grants on the forward link will naturally introduce overhead that uses some forward link capacity. Various options for mitigating the overhead associated with grants are detailed herein, and other options will be apparent to those of skill in the art in light of the teachings herein.

One consideration is that mobile stations will be situated such that each experiences varying channel quality. Thus, for example, a high geometry mobile station with a good forward and reverse link channel may need a relatively low power for grant signal, and is likely to be able to take advantage of a high data rate, and hence is desirable for an individual grant. A low geometry mobile station, or one experiencing deeper fading, may require significantly more power to receive an individual grant reliably. Such a mobile station may not be the best candidate for an individual grant. A common grant for this mobile station, detailed below, may be less costly in forward link overhead.

In the example embodiment, a number of individual F-GCH channels are deployed to provide the corresponding number of individual grants at a particular time. The F-GCH channels are code division multiplexed. This facilitates the ability to transmit each grant at the power level required to reach just the specific intended mobile station. In an alternative embodiment, a single individual grant channel may be deployed, with the number of individual grants time multiplexed. To vary the power of each grant on a time multiplexed individual F-GCH may introduce additional complexity. Any signaling technique for delivering common or individual grants may be deployed within the scope of the present invention.

In some embodiments, a relatively large number of individual grant channels (i.e. F-GCHs) are deployed, it may be deployed to allow for a relatively large number of individual grants at one time. In such a case, it may be desirable to limit the number of individual grant channels each mobile station has to monitor. In one example embodiment, various subsets of the total number of individual grant channels are defined. Each mobile station is assigned a subset of individual grant channels to monitor. This allows the mobile station to reduce processing complexity, and correspondingly reduce power consumption. The tradeoff is in scheduling flexibility, since the scheduling base station may not be able to arbitrarily assign sets of individual grants (e.g., all individual grants can not be made to members of a single group, since those members, by design, do not monitor one or more of the individual grant channels). Note that this loss of flexibility does not necessarily result in a loss of capacity. For illustration, consider and example including four individual grant channels. The even numbered mobile stations may be assigned to monitor the first two grant channels, and the odd numbered mobile stations may be assigned to monitor the last two. In another example, the subsets may overlap, such as the even mobile stations monitoring the first three grant channels, and the odd mobile stations monitoring the last three grant channels. It is clear that the scheduling base station cannot arbitrarily assign four mobile stations from any one group (even or odd). These examples are illustrative only. Any number of channels with any configuration of subsets may be deployed within the scope of the present invention.

The remaining mobile stations, having made a request, but not receiving an individual grant, may be given permission to transmit on the R-ESCH using a common grant, which specifies a maximum T/P ratio that each of the remaining mobile stations must adhere to. The common F-GCH may also be referred to as the Forward Common Grant Channel (F-CGCH). A mobile station monitors the one or more individual grant channels (or a subset thereof) as well as the common F-GCH. Unless given an individual grant, the mobile station may transmit if a common grant is issued. The common grant indicates the maximum T/P ratio at which the remaining mobile stations (the common grant mobile stations) may transmit for the data with certain type of QoS.

In the example embodiment, each common grant is valid for a number of subpacket transmission intervals. Once receiving a common grant, a mobile station which has sent a request but doesn't get an individual grant may start to transmit one or more encoder packets within the subsequent transmission intervals. The grant information may be repeated multiple times. This allows the common grant to be transmitted at a reduced power level with respect to an individual grant. Each mobile station may combine the energy from multiple transmissions to reliably decode the common grant. Therefore, a common grant may be selected for mobile stations with low-geometry, for example, where an individual grant is deemed too costly in terms of forward link capacity. However, common grants still require overhead, and various techniques for reducing this overhead are detailed below.

The F-GCH is sent by the base station to each mobile station that the base station schedules for transmission of a new R-ESCH packet. It may also be sent during a transmission or a retransmission of an encoder packet to force the mobile station to modify the T/P ratio of its transmission for the subsequent subpackets of the encoder packet in case congestion control becomes necessary.

Detailed below are examples of timing, including various embodiments with requirements for the interrelationship of access requests and grants of either type (individual or common). Additionally, techniques for reducing the number of grants, and thus the associated overhead, as well as for congestion control are detailed below.

In the example embodiment, the common grant consists of 12 bits including a 3-bit type field to specify the format of the next nine bits. The remaining bits indicate the maximum allowed T/P ratio for 3 classes of mobiles as specified in the type field, with 3 bits denoting the maximum allowable T/P ratio for each class. The mobile classes may be based on grade-of-service (GOS) requirements, or other criterion. Various other common grant formats are envisioned, and will be readily apparent to one of ordinary skill in the art.

In the example embodiment, an individual grant comprises 12 bits including: 11 bits to specify the Mobile ID and maximum allowed T/P ratio for the mobile station being granted to transmit, or to explicitly signal the mobile station to change its maximum allowed T/P ratio, including setting the maximum allowed T/P ratio to 0 (i.e., telling the mobile station not to transmit the R-ESCH). The bits specify the Mobile ID (1 of 192 values) and the maximum allowed T/P (1 of 10 values) for the specified mobile. In an alternate embodiment, 1 long-grant bit may be set for the specified mobile. When the long-grant bit is set to one, the mobile station is granted permission to transmit a relatively large fixed, predetermined number (which can be updated with signaling) of packets on that ARQ channel. If the long-grant bit is set to zero, the mobile station is granted to transmit one packet. A mobile may be told to turn off its R-ESCH transmissions with the zero T/P ratio specification, and this may be used to signal the mobile station to turn off its transmission on the R-ESCH for a single subpacket transmission of a single packet if the long-grant bit is off or for a longer period if the long-grant bit is on.

R-PICH

The Reverse Pilot Channel (R-PICH) is transmitted from the mobile station to the base stations in the Active Set. The power in the R-PICH may be measured at one or more base stations for use in reverse link power control. As is well known in the art, pilot signals may be used to provide amplitude and phase measurements for use in coherent demodulation. As described above, the amount of transmit power available to the mobile station (whether limited by the scheduling base station or the inherent limitations of the mobile station's power amplifier) is split among the pilot channel, traffic channel or channels, and control channels. Additional pilot power may be needed for higher data rates and modulation formats. To simplify the use of the R-PICH for power control, and to avoid some of the problems associated with instantaneous changes in required pilot power, an additional channel may be allocated for use as a supplemental or secondary pilot. Although, generally, pilot signals are transmitted using known data sequences, as disclosed herein, an information bearing signal may also be deployed for use in generating reference information for demodulation. In an example embodiment, the R-RICH (detailed below) is used to carry the additional pilot power desired.

R-RICH

The Reverse Rate Indicator Channel (R-RICH) is used by the mobile station to indicate the transmission format on the reverse traffic channel, R-ESCH. The R-RICH comprises 5-bit messages. The orthogonal encoder block maps each 5-bit input sequence into a 32-symbol orthogonal sequence. For example each 5-bit input sequence could be mapped to a different Walsh code of length 32. A sequence repetition block repeats the sequence of 32 input symbols three times. A bit repetition block provides at its output the input bit repeated 96 times. A sequence selector block selects between the two inputs, and passes that input to the output. For zero rates, the output of the bit repetition block is passed through. For all other rates, the output of the sequence repetition block is passed through. A signal point mapping block maps an input bit 0 to +1, and an input 1 to −1. Following the signal point mapping block is a Walsh spreading block. The Walsh spreading block spreads each input symbol to 64 chips. Each input symbols multiplies a Walsh code W(48, 64). A Walsh code W(48,64) is the Walsh code of length 64 chips, and index 48. TIA/EIA IS-2000 provides tables describing Walsh codes of various lengths.

Those of skill in the art will recognize that this channel structure is one example only. Various other encoding, repetition, interleaving, signal point mapping, or Walsh encoding parameters could be deployed in alternate embodiments. Additional encoding or formatting techniques, well known in the art, may also be deployed. These modifications fall within the scope of the present invention.

R-ESCH

The Enhanced Reverse Supplemental Channel (R-ESCH) is used as the reverse link traffic data channel in the example embodiments described herein. Any number of transmission rates and modulation formats may be deployed for the R-ESCH. In an example embodiment, the R-ESCH has the following properties: Physical layer retransmissions are supported. For retransmissions when the first code is a Rate $\frac{1}{4}$ code, the retransmission uses a Rate $\frac{1}{4}$ code and Chase combining is used. For retransmissions when the first code is a rate greater than $\frac{1}{4}$, incremental redundancy is used. The underlying code is a Rate $\frac{1}{5}$ code. Alternatively, incremental redundancy could also be used for all the cases.

Hybrid Automatic-Repeat-Request (HARQ) is supported for both autonomous and scheduled users, both of which may access the R-ESCH.

For the case in which the first code is a Rate $\frac{1}{2}$ code, the frame is encoded as a Rate $\frac{1}{4}$ code and the encoded symbols are divided equally into two parts. The first half of the symbols are sent in the first transmission, the second half in the second transmission, then the first half in the third transmission and so on.

Multiple ARQ-channel synchronous operation may be supported with fixed timing between the retransmissions: a fixed number of sub-packets between consecutive sub-packets of same packet may be allowed. Interlaced transmissions are allowed as well. As an example, for 5 ms frames, 4 channel ARQ could be supported with 3 subpacket delay between subpackets.

Table 1 lists example data rates for the Enhanced Reverse Supplemental Channel. A 5 ms subpacket size is described, and the accompanying channels have been designed to suit this choice. Other subpacket sizes may also be chosen, as will be readily apparent to those of skill in the art. The pilot reference level is not adjusted for these channels, i.e. the base station has the flexibility of choosing the T/P to target a given operating point. This max T/P value is signaled on the forward Grant Channel. The mobile station may use a lower T/P if it is running out of power to transmit, letting HARQ meet the required QoS. Layer 3 signaling messages may also be transmitted over the R-ESCH, allowing the system to operate without the FCH/DCCH.

TABLE 1

Enhanced Reverse Supplemental Channel Parameters

| Number of Bits per Encoder Packet | Number of 5-ms Slots | Data Rate (kbps) | Data Rate/ 9.6 kbps | Code Rate | Symbol Repetition Factor Before the Interleaver | Modulation | Walsh Channels | Number of Binary Code Symbols in All the Subpackets | Effective Code Rate Including Repetition |
|---|---|---|---|---|---|---|---|---|---|
| 192 | 4 | 9.6 | 1.000 | $\frac{1}{4}$ | 2 | BPSK on I | ++−− | 6,144 | $\frac{1}{32}$ |
| 192 | 3 | 12.8 | 1.333 | $\frac{1}{4}$ | 2 | BPSK on I | ++−− | 4,608 | $\frac{1}{24}$ |
| 192 | 2 | 19.2 | 2.000 | $\frac{1}{4}$ | 2 | BPSK on I | ++−− | 3,072 | $\frac{1}{16}$ |
| 192 | 1 | 38.4 | 4.000 | $\frac{1}{4}$ | 2 | BPSK on I | ++−− | 1,536 | $\frac{1}{8}$ |
| 384 | 4 | 19.2 | 2.000 | $\frac{1}{4}$ | 1 | BPSK on I | ++−− | 6,144 | $\frac{1}{16}$ |
| 384 | 3 | 25.6 | 2.667 | $\frac{1}{4}$ | 1 | BPSK on I | ++−− | 4,608 | $\frac{1}{12}$ |
| 384 | 2 | 38.4 | 4.000 | $\frac{1}{4}$ | 1 | BPSK on I | ++−− | 3,072 | $\frac{1}{8}$ |
| 384 | 1 | 76.8 | 8.000 | $\frac{1}{4}$ | 1 | BPSK on I | ++−− | 1,536 | $\frac{1}{4}$ |
| 768 | 4 | 76.8 | 4.000 | $\frac{1}{4}$ | 1 | QPSK | ++−− | 12,288 | $\frac{1}{16}$ |
| 768 | 3 | 102.4 | 5.333 | $\frac{1}{4}$ | 1 | QPSK | ++−− | 9,216 | $\frac{1}{12}$ |
| 768 | 2 | 153.6 | 8.000 | $\frac{1}{4}$ | 1 | QPSK | ++−− | 6,144 | $\frac{1}{8}$ |
| 768 | 1 | 307.2 | 16.000 | $\frac{1}{4}$ | 1 | QPSK | ++−− | 3,072 | $\frac{1}{4}$ |
| 1,536 | 4 | 76.8 | 8.000 | $\frac{1}{4}$ | 1 | QPSK | +− | 24,576 | $\frac{1}{16}$ |
| 1,536 | 3 | 102.4 | 10.667 | $\frac{1}{4}$ | 1 | QPSK | +− | 18,432 | $\frac{1}{12}$ |
| 1,536 | 2 | 153.6 | 16.000 | $\frac{1}{4}$ | 1 | QPSK | +− | 12,288 | $\frac{1}{8}$ |
| 1,536 | 1 | 307.2 | 32.000 | $\frac{1}{4}$ | 1 | QPSK | +− | 6,144 | $\frac{1}{4}$ |
| 2,304 | 4 | 115.2 | 12.000 | $\frac{1}{4}$ | 1 | QPSK | ++−−/+− | 36,864 | $\frac{1}{16}$ |
| 2,304 | 3 | 153.6 | 16.000 | $\frac{1}{4}$ | 1 | QPSK | ++−−/+− | 27,648 | $\frac{1}{12}$ |
| 2,304 | 2 | 230.4 | 24.000 | $\frac{1}{4}$ | 1 | QPSK | ++−−/+− | 18,432 | $\frac{1}{8}$ |
| 2,304 | 1 | 460.8 | 48.000 | $\frac{1}{4}$ | 1 | QPSK | ++−−/+− | 9,216 | $\frac{1}{4}$ |
| 3,072 | 4 | 153.6 | 16.000 | $\frac{1}{5}$ | 1 | QPSK | ++−−/+− | 36,864 | $\frac{1}{12}$ |
| 3,072 | 3 | 204.8 | 21.333 | $\frac{1}{5}$ | 1 | QPSK | ++−−/+− | 27,648 | $\frac{1}{9}$ |
| 3,072 | 2 | 307.2 | 32.000 | $\frac{1}{5}$ | 1 | QPSK | ++−−/+− | 18,432 | $\frac{1}{6}$ |
| 3,072 | 1 | 614.4 | 64.000 | $\frac{1}{5}$ | 1 | QPSK | ++−−/+− | 9,216 | $\frac{1}{3}$ |

TABLE 1-continued

Enhanced Reverse Supplemental Channel Parameters

| Number of Bits per Encoder Packet | Number of 5-ms Slots | Data Rate (kbps) | Data Rate/ 9.6 kbps | Code Rate | Symbol Repetition Factor Before the Interleaver | Modulation | Walsh Channels | Number of Binary Code Symbols in All the Subpackets | Effective Code Rate Including Repetition |
|---|---|---|---|---|---|---|---|---|---|
| 4,608 | 4 | 230.4 | 24.000 | 1/5 | 1 | QPSK | ++--/+-- | 36,864 | 1/8 |
| 4,608 | 3 | 307.2 | 32.000 | 1/5 | 1 | QPSK | ++--/+-- | 27,648 | 1/6 |
| 4,608 | 2 | 460.8 | 48.000 | 1/5 | 1 | QPSK | ++--/+-- | 18,432 | 1/4 |
| 4,608 | 1 | 921.6 | 96.000 | 1/5 | 1 | QPSK | ++--/+-- | 9,216 | 1/2 |
| 6,144 | 4 | 307.2 | 32.000 | 1/5 | 1 | QPSK | ++--/+-- | 36,864 | 1/6 |
| 6,144 | 3 | 409.6 | 42.667 | 1/5 | 1 | QPSK | ++--/+-- | 27,648 | 2/9 |
| 6,144 | 2 | 614.4 | 64.000 | 1/5 | 1 | QPSK | ++--/+-- | 18,432 | 1/3 |
| 6,144 | 1 | 1228.8 | 128.000 | 1/5 | 1 | QPSK | ++--/+-- | 9,216 | 2/3 |

In an example embodiment, turbo coding is used for all the rates. With R=¼ coding, an interleaver similar to the current cdma2000 reverse link is used, and, if a second subpacket is transmitted, it has the same format as the first subpacket. With R=⅕ coding, an interleaver similar to the cdma2000 Forward Packet Data Channel is used, and if a second subpacket is transmitted, the sequence of encoded and interleaved symbols selected for the second subpacket follow those selected for the first subpacket. At most, two subpacket transmissions are allowed, and if a second subpacket is transmitted, it uses the same data rate as the first subpacket transmission.

The number of bits per encoder packet includes the CRC bits and 6 tail bits. For an encoder packet size of 192 bits, a 12-bit CRC is used; otherwise, a 16-bit CRC is used. The number of information bits per frame is 2 more than with the corresponding rates with cdma2000. The 5-ms slots are assumed to be separated by 15 ms to allow time for ACK/NAK responses. If an ACK is received, the remaining slots of the packet are not transmitted.

The 5 ms subpacket duration, and associated parameters, just described, serve as an example only. Any number of combinations of rates, formats, subpacket repetition options, subpacket duration, etc. will be readily apparent to those of skill in the art in light of the teaching herein. An alternate 10 ms embodiment, using 3 ARQ channels, could be deployed. In one embodiment, a single subpacket duration or frame size is selected. For example, either a 5 ms or 10 ms structure would be selected. In an alternate embodiment, a system may support multiple frame durations.

F-CACKCH

The Forward Common Acknowledgement Channel, or F-CACKCH, is used by the base station to acknowledge the correct reception of the R-ESCH, as well as to extend an existing grant. An acknowledgement (ACK) on the F-CACKCH indicates correct reception of a subpacket. Additional transmission of that subpacket by the mobile station is unnecessary. The negative acknowledgement (NAK) on the F-CACKCH allows the mobile station to transmit the next subpacket up to the maximum allowed number of subpacket per packet. A third command, the ACK-and-Continue, allows the base station to acknowledge successful reception of a packet and, at the same time, permit the mobile station to transmit using the grant that led to the successfully received packet. One embodiment of the F-CACKCH uses +1 values for the ACK symbols, NULL symbols for the NAK symbols, and −1 values for the ACK-and-Continue symbols. In various example embodiments, detailed further below, up to 96 Mobile IDs can be supported on one F-CACKCH. Additional F-CACKCHs may be deployed to support additional Mobile IDs.

On-off keying (i.e., not sending NAK) on the F-CACKCH allows the base stations (especially non-scheduling base stations) an option of not sending the ACK when the cost (required power) of doing so is too high. This provides the base station a trade-off between the forward link and reverse link capacity, since a correctly received packet that is not ACKed will likely trigger a re-transmission at a later point in time.

A Hadamard Encoder is one example of an encoder for mapping onto a set of orthogonal functions. Various other techniques may also be deployed. For example, any Walsh Code or Orthogonal Variable Spreading Factor (OVSF) code generation may be used to encode. Different users may be transmitted to at different power levels if independent gain blocks are deployed. The F-CACKCH conveys one dedicated tri-valued flag per user. Each user monitors the F-ACKCH from all base stations in its Active Set (or, alternatively, signaling may define a reduced active set to reduce complexity).

In various embodiments, two channels are each covered by a 128-chip Walsh cover sequence. One channel is transmitted on the I channel, and the other is transmitted on the Q channel. Another embodiment of the F-CACKCH uses a single 128-chip Walsh cover sequence to support up to 192 mobile stations simultaneously. This approach uses 10-ms duration for each tri-valued flag.

There are several ways of operating the ACK channel. In one embodiment, it may be operated such that a "1" is transmitted for an ACK. No transmission implies a NAK, or the "off" state. A "−1" transmission refers to ACK-and-Continue, i.e. the same grant is repeated to the mobile station. This saves the overhead of a new grant channel.

To review, when the mobile station has a packet to send that requires usage of the R-ESCH, it sends the request on the R-REQCH. The base station may respond with a grant using the F-CGCH, or an F-GCH. However, this operation is somewhat expensive. To reduce the forward link overhead, F-CACKCH can send the "ACK-and-Continue" flag, which extends the existing grant at low cost by the scheduling base station. This method works for both individual and common grants. ACK-and-Continue is used from the granting base station, and extends the current grant for 1 more encoder packet on the same ARQ channel.

Note that, as shown in FIG. 4, not every base station in the Active Set is required to send back the F-CACKCH. The set of base stations sending the F-CACKCH in soft handoff may be a subset of the Active Set. Example techniques for transmitting the F-CACKCH are disclosed in co-pending U.S. patent application Ser. No. 10/611,333, entitled "CODE DIVISION MULTIPLEXING COMMANDS ON A CODE DIVISION MULTIPLEXED CHANNEL", filed Jun. 30, 2003, assigned to the assignee of the present invention.

Example Embodiments and Timing Diagrams

To summarize various features introduced above, mobile stations are authorized to make autonomous transmissions, which, while perhaps limited in throughput, allow for low delay. In such a case, the mobile station may transmit without request up to a max R-ESCH T/P ratio, $T/P_{Max\_auto}$, which may be set and adjusted by the base station through signaling.

Scheduling is determined at one or more scheduling base stations, and allocations of reverse link capacity are made through grants transmitted on the F-GCH at a relatively high rate. Scheduling may thus be employed to tightly control the reverse link load and thus protects voice quality (R-FCH), DV feedback (R-CQICH) and DV acknowledgement (R-ACKCH).

An individual grant allows detailed control of a mobile station's transmission. Mobile stations may be selected based upon geometry and QoS to maximize throughput while maintaining required service levels. A common grant allows efficient notification, especially for low geometry mobile stations.

The F-CACKCH channel may send "ACK-and-Continue" commands, which extend existing grants at low cost. This works with both individual grants and common grants.

Figure 5:
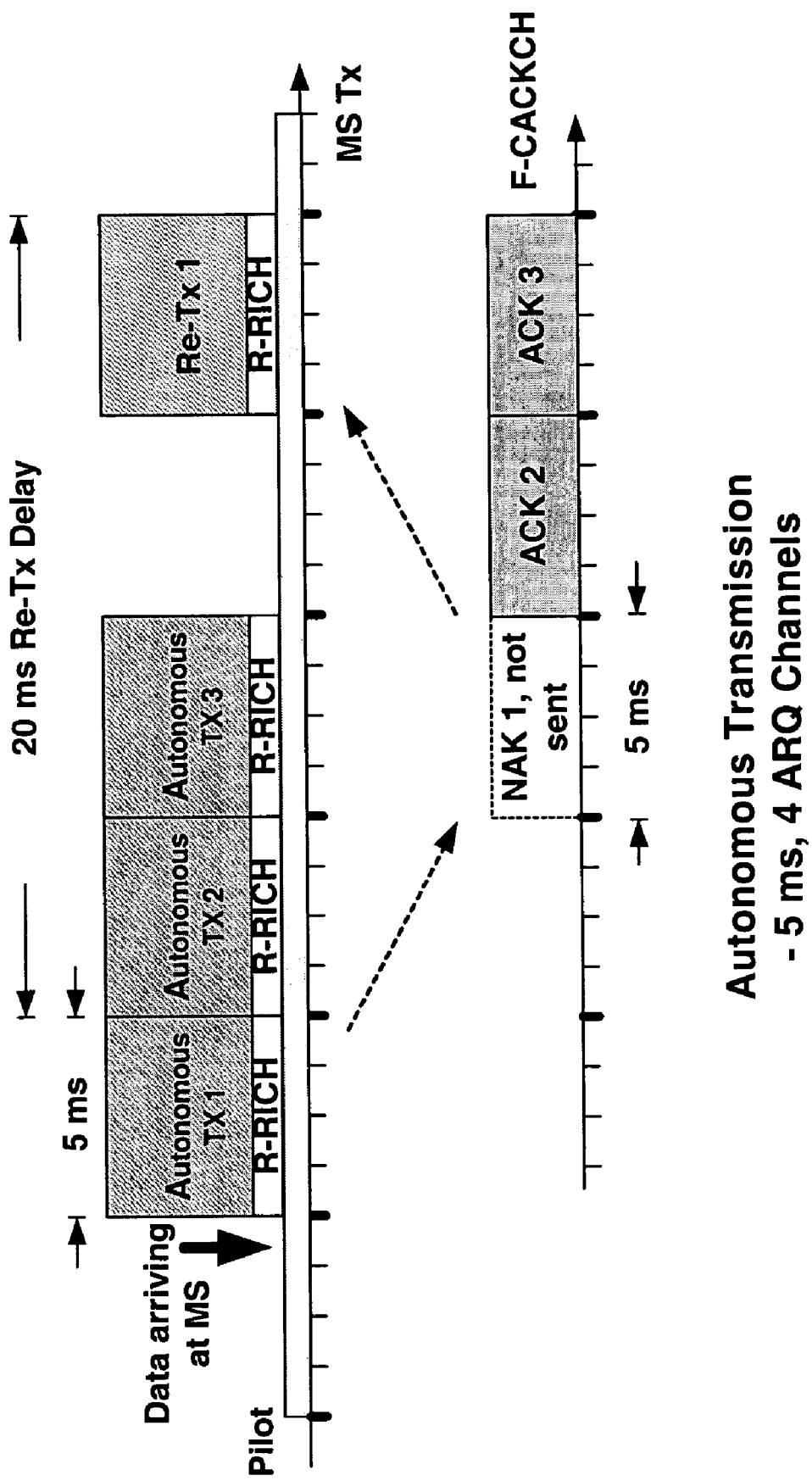
FIG. 5 is a timing diagram illustrating autonomous transmission.

FIG. 5 is a timing diagram illustrating autonomous transmission. In this example, a 5 ms sub-packet size is deployed, with 4 ARQ channels. In this example, the mobile station has data arrive for transmission that may be sufficiently transmitted using the autonomous transmission. The mobile station does not need to suffer the delay introduced by a request and subsequent grant. Rather, it may immediately transmit in the next ARQ channel. In this example system, a mobile station will not make a request unless it has an amount of data to transmit that is greater than could be transmitted in an autonomous transmission. The transmission rate, modulation format, and power level will be limited by the maximum Traffic to Pilot Ratio (T/P) allowed for autonomous transmission, given in this example by the parameter T/P auto. So, the mobile station need not make a request unless it has available transmit power to exceed $T/P_{max\_auto}$. A mobile station may opt to use autonomous transmission while making a request, to get the data transmission started (detailed further below). The mobile station may forego a request, even when the amount of data and available transmit power is greater than the minimum for a request, to possibly avoid the request and grant process and its associated delay if the system disallows autonomous transmission. In this example, the mobile station transmits its data in 3 ARQ channels.

The data transmitted by the mobile station is identified on the line labeled "MS Tx". Subsequent to the data arrival, the mobile station elects to send data on 3 of the 4 available ARQ channels. These three 5 ms transmissions are labeled Autonomous TX 1–3. Note that the R-RICH is transmitted along with the pilot, as described above. In general, the mobile station's transmissions may be received by a single base station, or multiple base stations in soft handoff. For clarity, in FIG. 5, only a single base station is shown responding to the mobile station transmission. The base station responds by transmitting ACK, NAK, or ACK-and-Continue commands to the mobile station on the F-CACKCH. The response to the first transmission, Autonomous TX 1, is sent concurrently with Autonomous TX 3, with a subpacket gap in between to allow time for the base station to fully receive, demodulate, and decode the first transmission, and determine whether or not the subpacket was received correctly. As described above, previously transmitted subpackets may be combined with a current subpacket in the demodulation process. In this example, the first transmission is not received correctly. Therefore, the base station will respond with a NAK. In this embodiment, an ACK is sent as a +1, a NAK is sent as a 0, and an ACK-and-Continue is sent as a −1. So, since a NAK is sent as a 0, a NAK is indicated by not transmitting on the F-CACKCH, as described above. The second and third transmissions are received correctly, and ACKed accordingly. Note that three ARQ channels are used by this mobile station, and the fourth is left vacant. In general, a mobile station may autonomously transmit during any ARQ period.

In this example, the NAK sent for the first transmission was not for the final subpacket (in this example, up to four transmissions of subpackets are allowed for each packet). So, the mobile station will retransmit. In order to receive and decode the F-CACKCH command, a subpacket delay will occur between the NAK 1 and the retransmission of the first transmission, Re-Tx 1. Thus, in this example, there is a 20 ms re-transmission delay, as shown.

Figure 6:
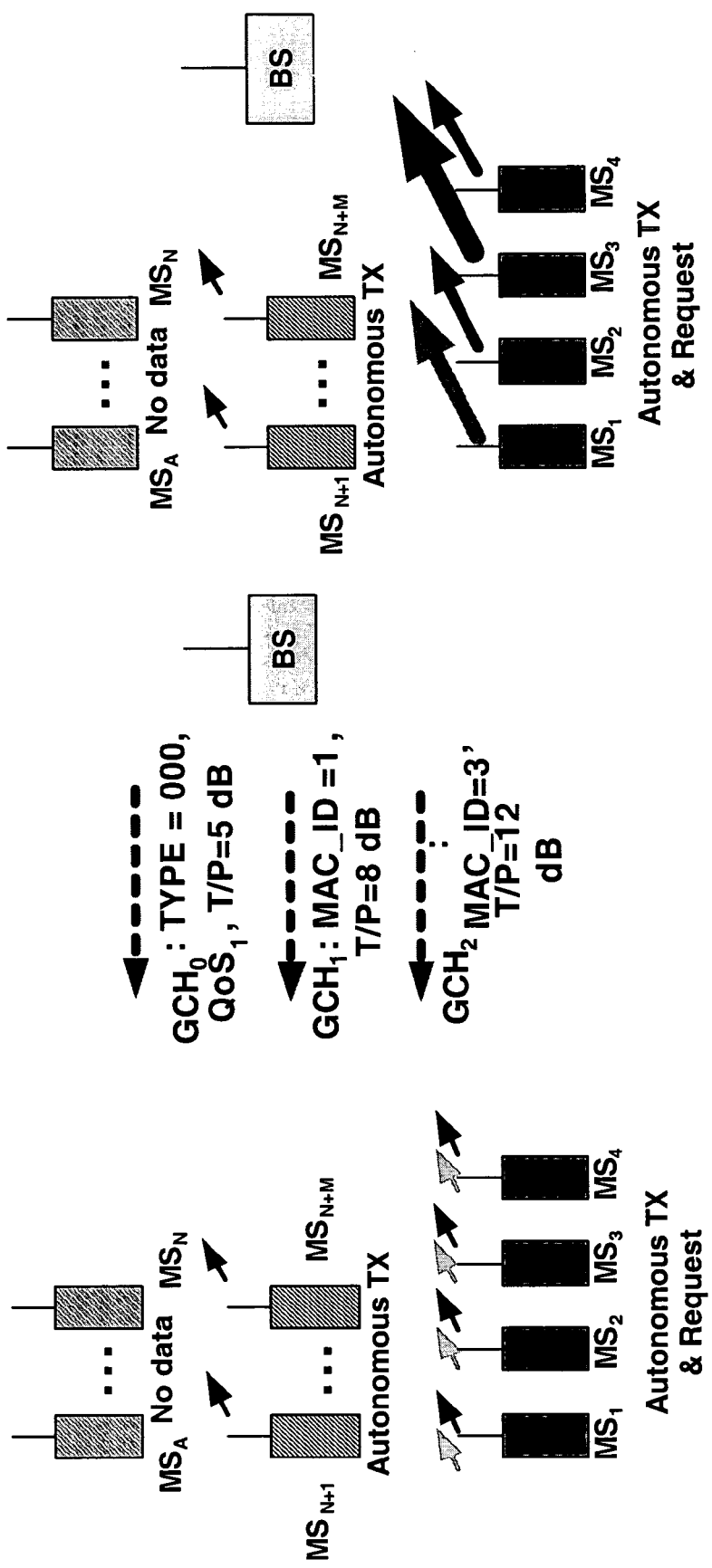
FIG. 6 illustrates an example system including mobile stations communicating with a scheduling base station.

FIG. 6 illustrates an example system with mobile stations communicating with a scheduling base station. One group of mobile stations, $MS_A$–$MS_N$, have no data to transmit. Another group of mobile stations, $MS_{N+1}$–$MS_{N+M}$, will transmit autonomously, with no request. Four mobile stations, $MS_1$–$MS_4$, will make a request to the scheduling base station, BS, as well as transmit autonomously while awaiting a possible grant. These transmissions and requests occur in the column labeled Request.

A mobile station requests the R-ESCH high rate transmission when it has enough power and enough data. The supportable R-ESCH T/P is at least one level higher than T/PMax_auto, and, the data in the buffer is enough to fill at least one encoder packet larger than supported by T/PMax_auto, after accounting for autonomous transmission and T/PMax_auto during the granting delay. In this embodiment, requests may also be limited with a minimum re-request time. To avoid excessive requests, a timer may be used to make sure a pre-determined amount of time has transpired between a previous request and a new request while the power and queue conditions just described are satisfied. Note that the timer length may be set deterministically or probabilistically. Various embodiments may allow that a timer requirement may be overridden when the buffer size has increased or supportable T/P has changed since the last request as well. In this embodiment, a mobile station requests R-ESCH transmission using the R-REQCH. An example request message comprises 4 bits each for supportable R-ESCH T/P, data queue size, and QoS level. Myriad request message configurations are envisioned, and will be readily deployed by those of skill in the art in light of the teachings herein.

Various priority schemes may also be deployed. For example, QoS class may determine whether, or at what rate, the mobile station may send a request. For example, a premium subscriber may be given higher access priority in comparison with an economy subscriber. Differing data types may also be assigned differing priorities. A priority scheme may be deterministic or probabilistic. The parameters associated with the priority scheme may be updated through signaling, and may be modified based on system conditions such as loading.

In the column identified as "Grant: Individual and Common", the scheduling base station, BS, receives the transmissions and requests. BS determines how to assign grants based on the requests received. The BS may take into account the expected number of autonomous transmissions and the available reverse link capacity (in accordance with other supported channels, including non-DV channels such as voice and other reverse link data or control channels) in order to determine what type of grants, if any, may be supported. In this example, $GCH_0$ is defined as the common grant channel. A common grant is issued, including a type, QoS, and T/P for the grant. In this example, a type of "000" is identified, quality of service $QoS_1$ and T/P=5 dB are given for the common grant. Those of skill in the art will recognize that any number of types or QoS designations may be deployed in any given system. In an alternate embodiment, a common grant may simply apply to any requesting mobile station, any requesting mobile stations with a quality of service requirement above some level, or any desired level of complexity may be deployed to configure various mobile stations to respond to a grant, based on the desired level of differentiation between mobile stations. In another alternate embodiment, multiple common grant channels may be deployed, with various mobile stations assigned to respond to grants on differing subsets of the grant channels. This assignment may be based on the QoS level the mobile stations need, the soft handoff situation of the mobile station, or other factors.

In this embodiment, the base station may make specific grants, or individual grants, to up to N mobile stations simultaneously, to transmit one new encoder packet. The number, N, of individual grants may be determined according to the system capacity, as well as to varying load conditions.

In the example shown, one mobile station is granted per F-GCH (except the common grant channel, $GCH_0$), although, in an alternate embodiment, specific grants could be directed to a group of mobile stations assigned to a grant channel by the use of a common (group) ID that is assigned to the mobile stations in the group. In this example, the grant message comprises a 12-bit payload, with an 8-bit mobile station ID and a 4-bit allowed R-ESCH T/P. The individual grant applies to a single ARQ channel. In an alternate embodiment, a long grant message may also be supported, with a flag to include one or more additional ARQ channels in the grant. In various embodiments described herein, a single ARQ channel specific grant will be described for clarity. Those of skill in the art will readily expand the principles disclosed to long grants.

To reduce complexity of decoding grants in a mobile station, a mobile station may be notified to monitor just a subset of the grant channels.

In this embodiment, the base station may make a common grant to the remaining requesting MS using $F-GCH_0$. No mobile station ID is needed as the common GCH is on a fixed Walsh code. As detailed further below, a message on $F-GCH_0$ is repeated over 20 ms (4 ARQ channels) to save forward link power. (Recall that one of the benefits of a common grant is to reach low-geometry mobile stations, to which a specific grant would be relatively costly). The grant message content is extendible: in this case, 3 bits are designated for a TYPE field. The TYPE field may specify any desired parameters. In this example, it also determines the format for the QoS designation (i.e. Type="000" corresponds to a 3-bit T/Pj for QoS class j, j=0, 1, 2). Any other types, known in the art, may be used to extend this channel.

In this example, two specific grants are made to mobile stations $MS_1$ and $MS_3$, as indicated by the MAC_IDs 1 and 3. These grants are made on grant channels $GCH_1$ and $GCH_2$. The two specific grants allow for a T/P of 8 dB and 12 dB, respectively. The mobile stations given specific grants will be able to determine the data rate and modulation format desired for each assigned T/P (detailed further below). Note that only $MS_1$ and $MS_3$ receive specific grants. Thus, $MS_2$ and $MS_4$ will rely on the common grant, and its lower T/P of 5 dB.

In the column labeled Transmission, the various mobile stations will transmit data, if any, according to the common and specific grants, or autonomously, as applicable.

Figure 7:
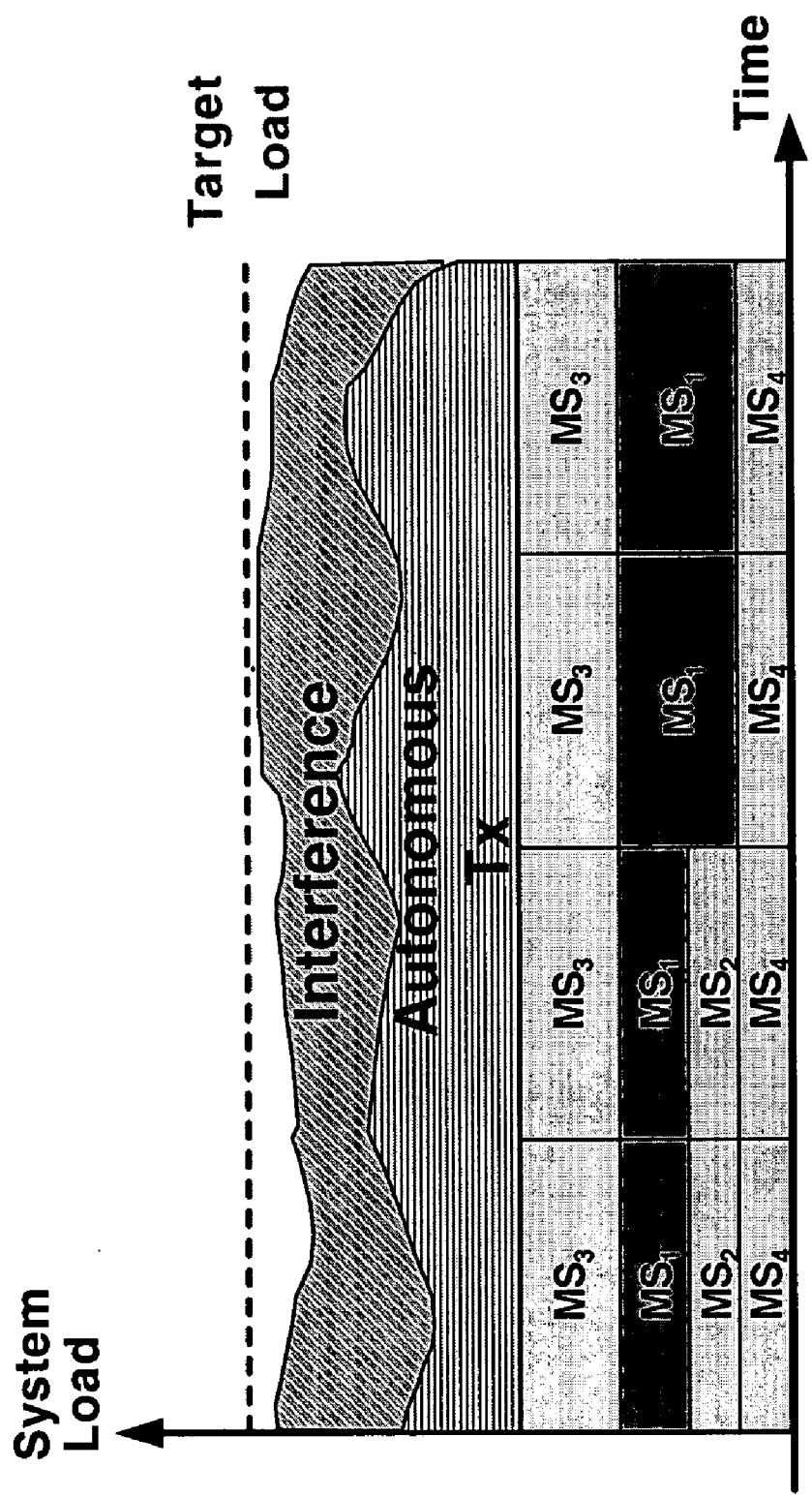
FIG. 7 illustrates system loading in response to grants and autonomous transmission.

FIG. 7 illustrates the system loading in response to the grants and autonomous transmission given in the example of FIG. 6. A target load is defined for the desired overall system load. An interference component is identified, which may include the various alternate voice and/or data channels supported by the system (e.g. non-DV channels in a 1xEV-DV system). The common and specific grants are determined to allow the sum of the granted transmissions (common and individual), expected autonomous transmission, and interference to be at or below the target load. Data throughput may be lowered, reducing capacity, if the target load is exceeded (requiring excessive retransmission). When the system load is below the target load, some of the reverse link capacity is unutilized. Thus, the scheduling base station determines individual grants to efficiently load the reverse link. Corresponding to the example requests depicted in FIG. 6, transmission by mobile stations $MS_1$–$MS_4$ are shown. The base station has flexibility in scheduling. For example, in this case, the base station knows from its request that $MS_2$ will complete its transmission within two packets based on the common grant. Thus, the individual grant to $MS_1$ may be increased for the latter two packets shown.

Figure 8:
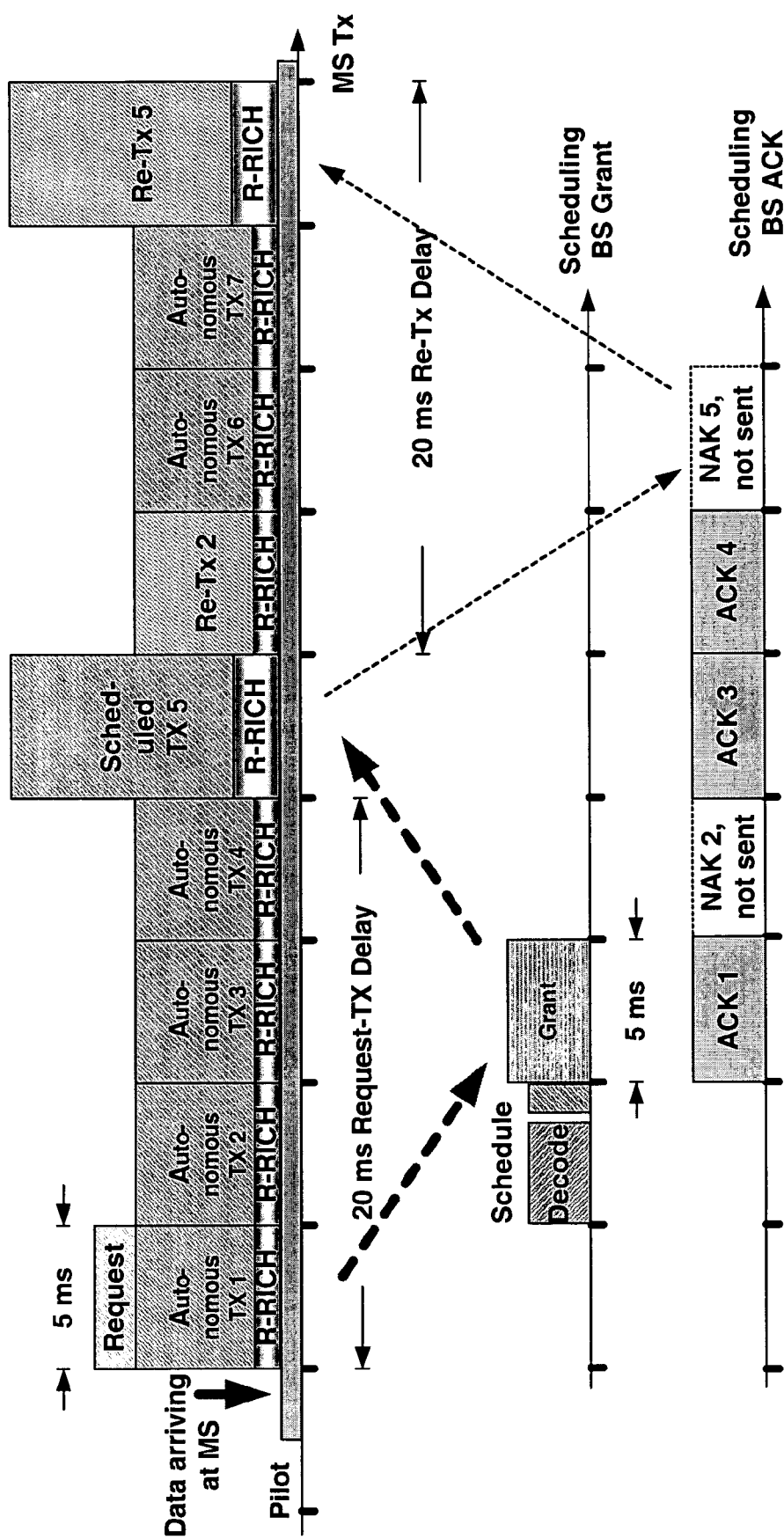
FIG. 8 is a timing diagram showing the operation of a request and grant, along with autonomous transmission and operation of the F-CACKCH.

FIG. 8 is a timing diagram showing the operation of a request and grant, along with autonomous transmission and operation of the F-CACKCH. This example shows a mobile station communicating with a scheduling base station, without soft handoff. In this example, four 5 ms ARQ channels are deployed. Myriad other configurations may be deployed by one of skill in the art in light of the principles disclosed herein.

Subsequent to data arriving at the mobile station for transmission, the mobile station determines that the conditions support a request for a grant of increased throughput on the reverse link. The mobile station forms a request message and transmits it along with an autonomous transmission, TX 1, to get started. The request is 5 ms in duration, in this example. A shorter request and/or grant may facilitate faster assignment of reverse link resources, as well as faster adjustment of those assignments. A longer request and/or grant can be transmitted at lower power, or can more easily reach lower geometry mobile stations. Any of the various permutations of packet duration, request duration, grant duration, and the like, are envisioned, and will be readily deployed by those of skill in the art in light of the teaching herein.

During the following ARQ channel, the base station receives the request, along with any requests from other supported mobile stations, and decodes them. Subsequent to decoding, the base station makes a scheduling decision, i.e. what types of individual or common grants, if any, will be made. During this time, the mobile station transmits a second subpacket, TX 2, autonomously on the second ARQ channel. The mobile station also uses this packet duration to decode the received TX 1.

During the third ARQ channel, a 5 ms grant is made by the scheduling base station to the mobile station. An example grant message is described above. In addition to identifying the mobile station to which the grant is made (which may be done in any of a variety of ways, including using a mobile ID, or a specific grant channel for the mobile station, etc.), a maximum T/P is assigned for the duration of the grant. At the same time, the mobile station continues its autonomous transmission, transmitting TX 3. The base station has had time to decode TX 1 and determine if it was received correctly. In this example, it was, so an ACK is sent on the scheduling (or granting) base station's F-CACKCH, on a subchannel assigned for this mobile station. Those of skill in the art will recognize that any alternative technique or means may also be deployed to convey the ACK to the sending mobile station.

During the fourth ARQ channel, the mobile station will be receiving and decoding the ACK and the Grant from the scheduling base station. Meanwhile, it continues its autonomous transmission, transmitting TX 4. In this example, the scheduling base station did not receive the autonomous transmission of TX 2 correctly, thus a NAK of TX 2 is indicated by a non-transmission on the F-CACKCH.

Having decoded the NAK as well as the grant in the fourth ARQ channel, the mobile station makes a scheduled transmission in the fifth packet, which is again the first ARQ channel. Note that to reduce the forward link overhead, an alternative embodiment does not send an ACK at the same time an individual GCH is sending a grant to the mobile station. That is, the mobile station will interpret the reception of a grant as the simultaneous grant and an ACK. Rather than transmitting at the limited autonomous T/P, the mobile station makes a determination of the rate and modulation format desired for the granted T/P, and makes that transmission, TX 5. Note that, in this example, the R-RICH is transmitted with the rate indicator at increased power, to aid in the demodulation of the higher rate transmission, as described above. Note the causal relationship between the request in the first subpacket duration, the grant in response in the third subpacket duration, and the transmission according to the grant in the fifth. Also during this fifth subpacket duration, the base station sends an ACK corresponding to TX 3.

In the sixth subpacket duration, or ARQ 2, the mobile station has decoded the NAK of TX 2, and retransmits that subpacket. Meanwhile, the base station sends an ACK in response to the correct decoding of autonomous TX 4, and will be attempting to decode the TX 5 transmitted and received in the previous frame.

In the seventh subpacket duration, the base station has determined that TX 5 was incorrectly decoded, and a NAK is indicated, i.e. not sent, in this example. This may be due to the fact that mobile station has some discretion over the type of data transmission it desires, within the T/P parameters specified by the grant. Thus, if low latency throughput is desired, the mobile station will select a rate and modulation format that is likely to result in the first subpacket being decoded correctly (although one or more subpackets may still be required in this case, the rate may be selected in accordance with the desired probability of successful first transmission). Perhaps, in this example, the mobile station has instead opted to select a rate and format to get the maximum data through during the grant. In such a case, it may be likely that all the subpackets allowed (4, in this example) will be required before correct decoding takes place. Thus, the next two retransmissions of packet 5 will also likely be NAKed. The base station combines the subpackets from each subsequent transmission to increase the demodulation performance, as described above. Of course, the rate may also be selected such that only two re-transmissions are likely to be required, etc. This selection process will be described in more detail below. Meanwhile, the mobile station is autonomously transmitting TX 6 on this ARQ channel (ARQ channel 3, in this example).

During the eighth subpacket duration, the mobile station is given an opportunity to decode the NAK sent and received in the previous frame. Meanwhile, autonomous transmission continues on this fourth ARQ channel, as TX 7 is transmitted.

In the ninth subpacket duration, the mobile station has decoded the NAK of TX 5, and so TX 5 is retransmitted. Note that, in this example, there is a 20 ms delay from one transmission to a retransmission of that packet in a subsequent frame. Note also that there is a 20 ms delay from the request until the first opportunity, if any, to transmit in response to the grant made according to the request.

Figure 9:
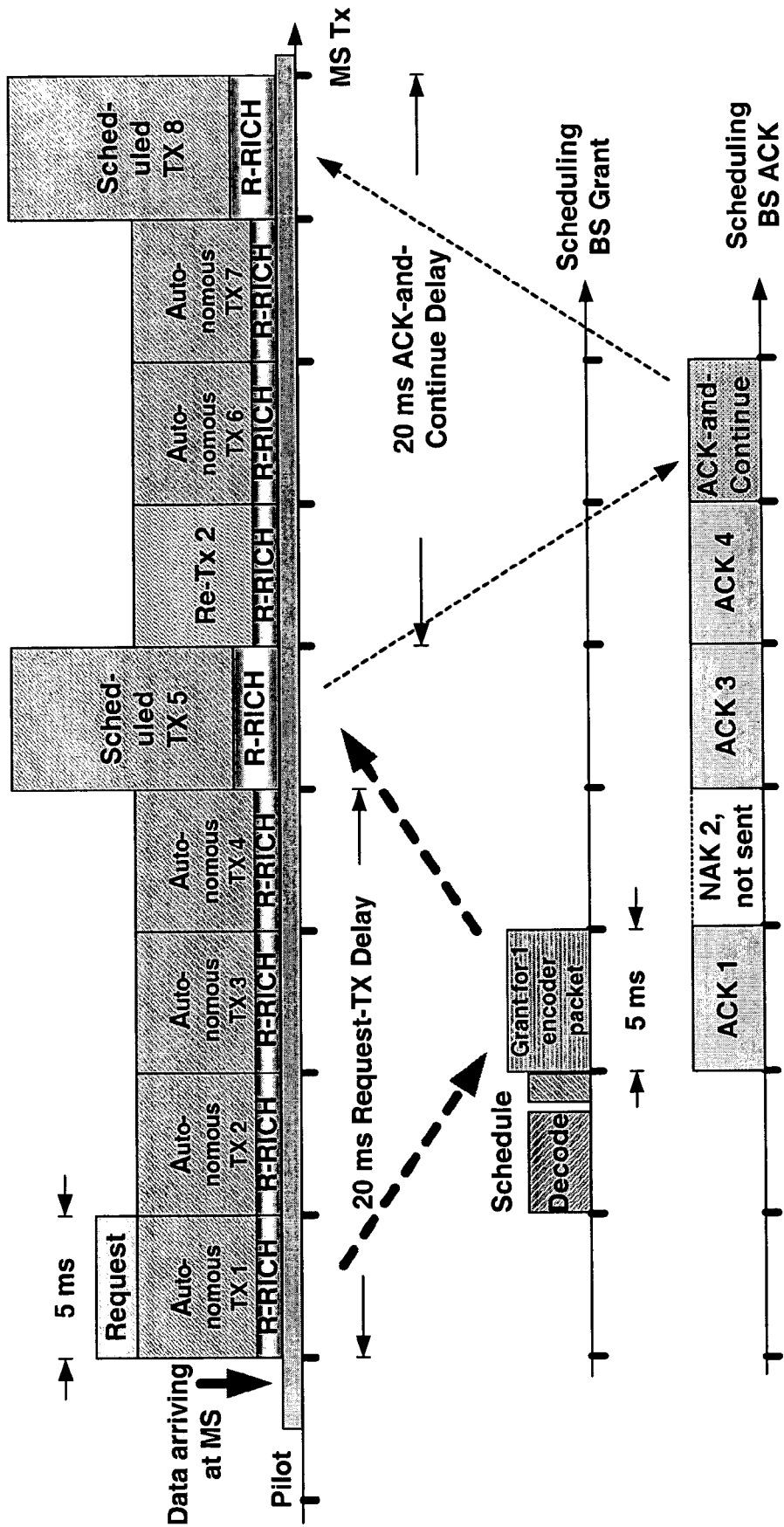
FIG. 9 is a timing diagram illustrating an example operation of the ACK-and-Continue command.

FIG. 9 is a timing diagram illustrating an example operation of the ACK-and-Continue command. This diagram is very similar to FIG. 8, so only the differences will be highlighted. The same four 5 ms ARQ channels are deployed, and the autonomous transmissions occur identically as in FIG. 8. TX 2 is NAKed as well, as before.

In this example, however, note that the individual grant made in response to the request is for one encoder packet only. When TX 5 is transmitted in response to the grant, the base station has two alternatives when TX 5 is received correctly (in FIG. 8 is was received in error, and had to be retransmitted). The base station will know whether the mobile station's buffer contains more data, as given in the request. In order to avoid the overhead and cost of signaling associated with a new grant and request, the base station may determine that the individual grant should be continued. Of course, the base station takes into consideration the expected autonomous loading, the interference from other channels, as well as the other common and individual grants. In this example, the base station makes such a determination, and sends the ACK-and-Continue on the F-CACKCH. This indicates to the mobile station that TX 5 was received correctly, no additional retransmissions will be necessary. In addition, the mobile station knows that it may continue its scheduled transmission without an additional request. Therefore, as shown, in response to the ACK-and-Continue command, the mobile station transmits scheduled transmission TX 8.

If the base station had, for whatever reason, decided that it would be better for the mobile station not to continue transmitting, an ACK could have been sent instead of the Ack-and-Continue. Then, the mobile station would still be made aware that TX 5 was received correctly and that no retransmission will be necessary. However, the mobile station's grant has now expired, and so only autonomous transmission would be available during the ninth subpacket duration (details not shown). Various options and techniques employing the ACKs and ACK-and-Continues will be detailed further below.

Figure 10:
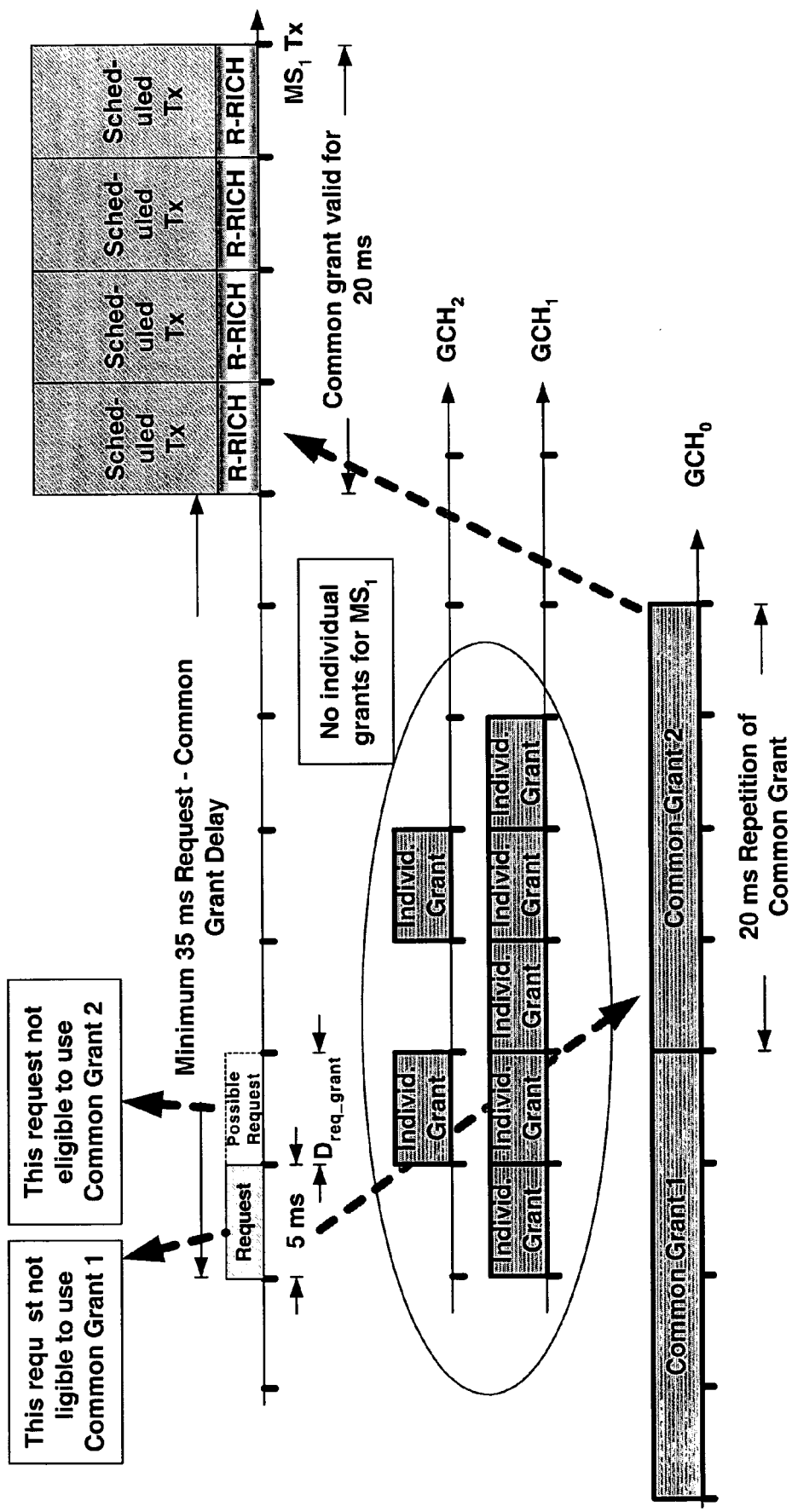
FIG. 10 is a timing diagram illustrating the operation of a common grant.

FIG. 10 is a timing diagram illustrating the operation of a common grant. As described above, all requesting mobile stations may be granted by a common grant of a maximum R-ESCH T/P, $T/P_{Max\_common}$, where, $T/P_{Max\_common} \geq T/P_{Max\_auto}$. A mobile station without an individual grant may use the first F-GCH$_0$ common grant received at a time $D_{req\_grant}$ after the request. This delay ensures the scheduling base station time to receive the request and to modify the common grant accordingly. The common grant is valid for the repetition duration of F-GCH$_0$, starting 5 ms after the end of the grant. These specific parameters are defined for clarity of discussion only, as any parameters may be deployed in alternate embodiments.

As described in FIG. 9, the base station may use ACK-and-Continue to extend the grant for a commonly granted mobile station. This, in effect, transfers the selected mobile station's common grant to an individual grant for each, using the previous common grant to set the transmission parameters. In addition, sending a new common grant may be used to reduce the T/P for those mobile stations not receiving the ACK-and-Continue. The base station is free to refrain from sending a new common grant, thus removing all but the selected mobile stations. Sending an ACK to selected mobile stations may be used for removing the common grant for those mobile stations. Of course, a specific grant to one or more previously common granted mobile stations may be made to reduce or retract their common grant, although the cost of a specific grant for this purpose may prove to be too high. In an alternate embodiment, if so desired, a new $T/P_{max\_common}$ may apply to common granted mobile stations operating with an ACK-and-Continue, allowing their grants to be modified in bulk with a single common grant. In yet another alternative, if the common grant T/P increases from that used by a mobile station continuing under a common grant with ACK-and-Continue, that mobile station may take advantage of the higher T/P. Any combination of these techniques may be deployed. Signaling may be used to modify the behavior of mobile stations responding to common grants, and different classes of mobile stations may follow different rules based on their class. Thus, for example, premium or economy status may be given to a mobile station, or to different classifications of data type.

Thus, in this example, the request shown in FIG. 10 is too late to allow MS$_1$ to use Common Grant 1, as shown. A possible request, subsequent to the request shown, would be too late to allow MS$_1$ to use Common Grant 2. Note that, in this example, none of the individual grants transmitted on GCH$_2$ and GCH$_1$ are directed to MS$_1$. In this common grant example, the common grant is transmitted on GCH$_0$ and is repeated over 20 ms. This allows the common grant to be transmitted at a relatively lower power than an individual grant, reducing the reverse link capacity required for the common grant, and allowing it to be used to reach lower geometry mobile stations. Any encoding scheme may be employed to increase the effective reach of the common grant. For example, the grant may be repeated 4 times, 5 ms for each repetition. The mobile stations may combine as many grant repetitions as required to decode the grant. In another alternative, a Forward Error Control (FEC) encoding scheme may be employed that spreads the grant over the entire common grant period. Various encoding schemes are well known in the art.

The scheduled transmissions of MS$_1$ are transmitted in response to Common Grant 2, with one 5 ms frame in between the end of Common Grant 2 and the beginning of the scheduled transmissions, to allow the mobile station time to decode the common grant. The common grant is valid for 20 ms, or 4 ARQ channels. While a grant duration of any length may be deployed, in this embodiment, a common grant duration that is longer than the individual grant is used. This allows the frequency of common grants (which may be used when individual grants are expensive) to be lower for a given amount of data transmission. An alternative embodiment has common grant channels that might have shorter or longer duration but instead less payload (fewer bits per grant) in order to reduce the forward link power cost. Note that the Walsh space overhead on the forward link by a grant channel with fewer bits is also lowered.

The delay from the request to the scheduled transmission, Common Grant Delay, is thus a minimum of 35 ms, which may be longer if the request had occurred earlier with respect to the beginning of Common Grant 2. This example allows the base station to take a conservative approach to scheduling, in that all the requests are known in advance of a common grant issue. In a relatively more liberal alternative, a mobile station may be allowed to tack onto the latest validly received common grant, requiring the base station to reduce the common grant if the number of requests availing of a common grant should prove too high.

Note that autonomous transmissions are omitted in FIG. 10, for clarity. It may be likely that MS$_1$ would send as many autonomous transmissions as are available during the Common Grant Delay. A system embodiment may dictate that MS$_1$ take advantage of available autonomous transmission, but this is not mandatory. In various alternate embodiments, a mobile station may be allowed to make the choice to make a request concurrently with autonomous transmission, may be required to autonomously transmit while requesting and waiting for a grant, or may be prohibited from autonomously transmitting while a request is pending. Those of skill in the art will readily deploy myriad configurations of autonomous and scheduled transmission, using various combinations of individual and common grants.

Figure 11:
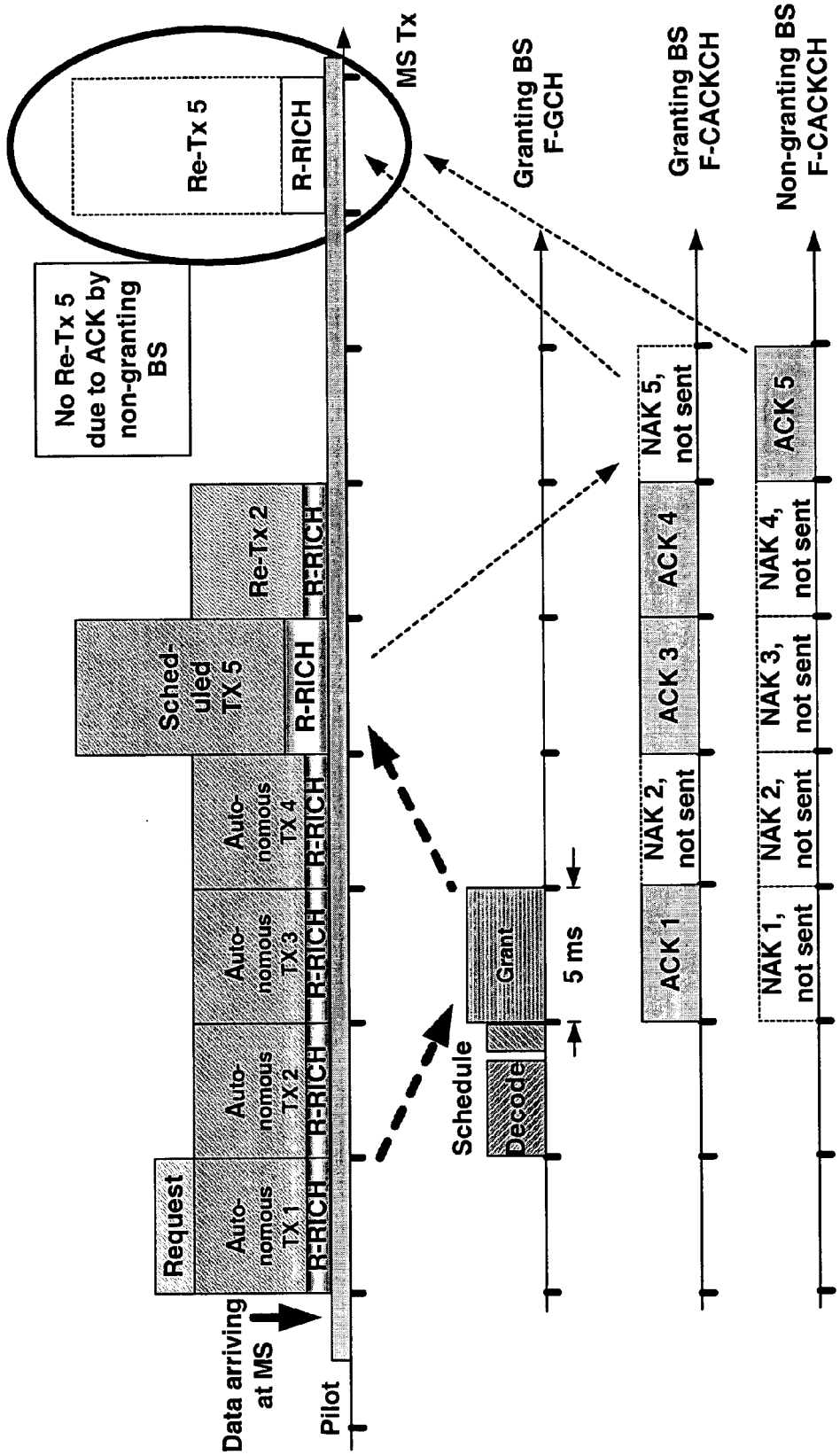
FIG. 11 is a timing diagram illustrating a non-granting base station participating in decoding a reverse link transmission from and acknowledgement to a mobile station in soft handoff.

FIG. 11 is a timing diagram illustrating a non-granting base station participating in decoding a reverse link transmission from and acknowledgement to a mobile station in soft handoff. The first six frames are similar to those depicted in FIG. 8. The mobile station makes a request to transmit data, as well as autonomous transmissions TX 1–4. The granting base station receives the request, decodes it, and determines the appropriate scheduling. An individual grant is made, after which the mobile station transmits scheduled transmission TX 5. As in FIG. 8, the granting base station does not decode TX 2 correctly, and NAKs that subpacket. The non-granting base station, monitoring the reverse link transmissions of the mobile station in soft handoff, does not decode correctly any of the first 4 autonomous transmissions TX 1–4. Thus, neither base station ACKs TX 2, and the mobile station retransmits TX 2, as in FIG. 8. The granting base station also NAKs the scheduled transmission TX 5, as in FIG. 8. However, the non-granting base station does decode TX 5 correctly, and so an ACK is transmitted on the non-granting base station's F-CACKCH. Therefore, the re-transmission of TX 5, shown in FIG. 8, is omitted in the example of FIG. 11 (as indicated by the dashed outline of the retransmission, circled). This is one example of soft handoff base station participation.

Depending on the coordination of base stations, various embodiments with differing resulting mobile station behavior may be deployed. In an example system without tight coordination between base stations, grants as well as ACK-and-Continue commands come from the granting base station only. In this case, the granting base station may have allocated some capacity for the expected retransmission. One option is to have the mobile station transmit new data in the slot allocated for the re-transmission, to utilize the allocated capacity. However, a new grant, or an ACK-and-Continue, in various embodiments, allows the mobile station to transmit a pre-determined number of subpackets (4 in this example). So, if the mobile station's new data requires additional subpackets beyond the remainder of those allocated for TX 5, the grant will have been extended. One solution is for the base station to recognize the new data and factor the possible extension into future scheduling. An alternative is to restrict the mobile station to selecting a rate and format for the new data transmission that is expected to terminate within the remaining subpackets allocated in the previous grant (or ACK-and-Continue). The granting base station may then ACK the new data to stop any additional continuation, if desired. The mobile station may also abort the new data at the end of the previous grant if it has not been acknowledged (i.e., the mobile station limits itself to a smaller number of available subpackets for the new data transmission).

In an example system in which base stations in soft handoff are more tightly coordinated, the non-granting base station may be empowered to send an ACK-and-Continue. The base stations may then coordinate the allocation of system load as appropriate.

In the example embodiment, while ACK and NAK may be sent from multiple base stations in soft handoff, ACK-and-Continue comes from the scheduling base station sectors only. Therefore inter-base station scheduling is not required, which may be a benefit for base station vendors and system operators. One advantage may be that a very high speed link between base stations may not be required. For example, a high speed backhaul link between multiple base stations would be needed to support data arriving in one 5 ms frame, with 5 ms to decode, followed by transmission of a coordinated ACK, NAK, or ACK-and-Continue. Thus, in one embodiment, a mobile station listens to the serving or scheduling base station only for grants and/or ACK-and-Continue. In an alternate embodiment, still with uncoordinated base station grants, the mobile station may listen to multiple base stations in soft handoff for grants and/or ACK-and-Continue, and some arbitration scheme may be employed when conflicting signals arrive. For example, so as not to exceed the anticipated system load by any granting base station, the mobile station may transmit at the minimum allowed grant T/P among all base stations in the mobile station's Active Set. Note that other mobile station rules than "minimum of all" can be used, including probabilistic behavior based on the allowed grant T/P. Conflicting responses including an ACK-and-Continue may be handled as described above with respect to FIG. 11.

In an alternate embodiment, with a faster backhaul between base stations, coordination between base stations to transmit to a single mobile station may be done. So for example, the same command transmitted from all base stations may be coordinated and sent (i.e. either type of grant, or ACK-and-Continue.)

Figure 12:
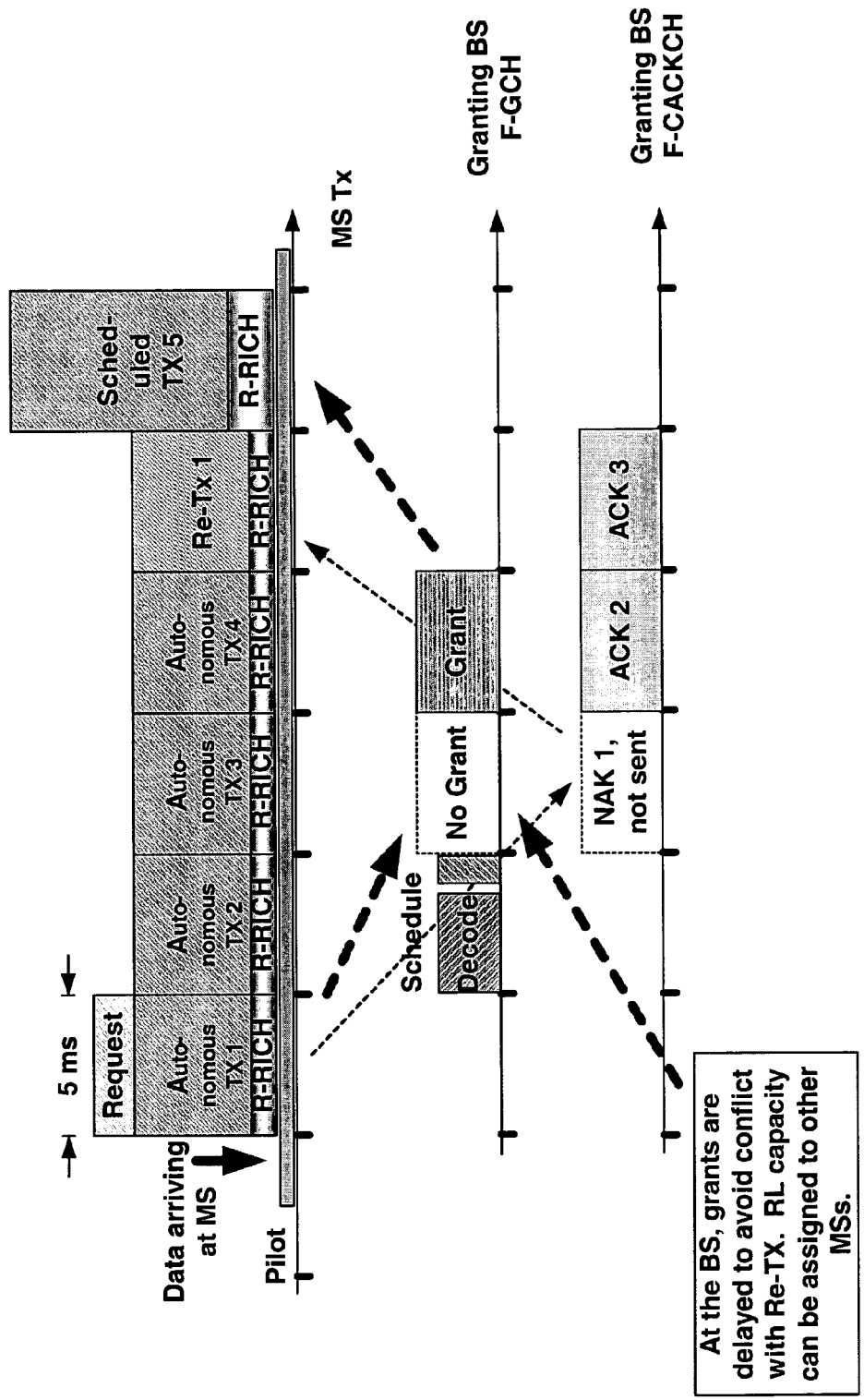
FIG. 12 is a timing diagram illustrating an example embodiment in which re-transmission is given priority over a scheduled grant.

FIG. 12 is a timing diagram illustrating an example embodiment in which re-transmission is given priority over a scheduled grant. The mobile station makes a request while autonomously transmitting TX 1. The granting base station decodes the request and makes a scheduling decision that will include a grant of the mobile station's request. However, TX 1 is not decoded correctly at the base station, and so TX 1 is NAKed. Since the ARQ channel that would be allocated for the scheduled transmission is also the ARQ channel on which TX 1 would be re-transmitted, the base station delays the grant. The reverse link allocation for that ARQ channel can be assigned to a different mobile station. In this example, the grant is issued on the following frame. Thus, the mobile station re-transmits TX 1 on the fifth frame, and transmits the scheduled TX 5 on the subsequent ARQ channel. In this way, the base station may allocate grants to avoid conflicts with re-transmissions. In one embodiment, to take advantage of a higher reliability grant channel, a mobile station may give priority to a received grant with respect to any NAK, ACK, or ACK-and-Continue command from a lower reliability channel (F-CACKCH).

Figure 13:
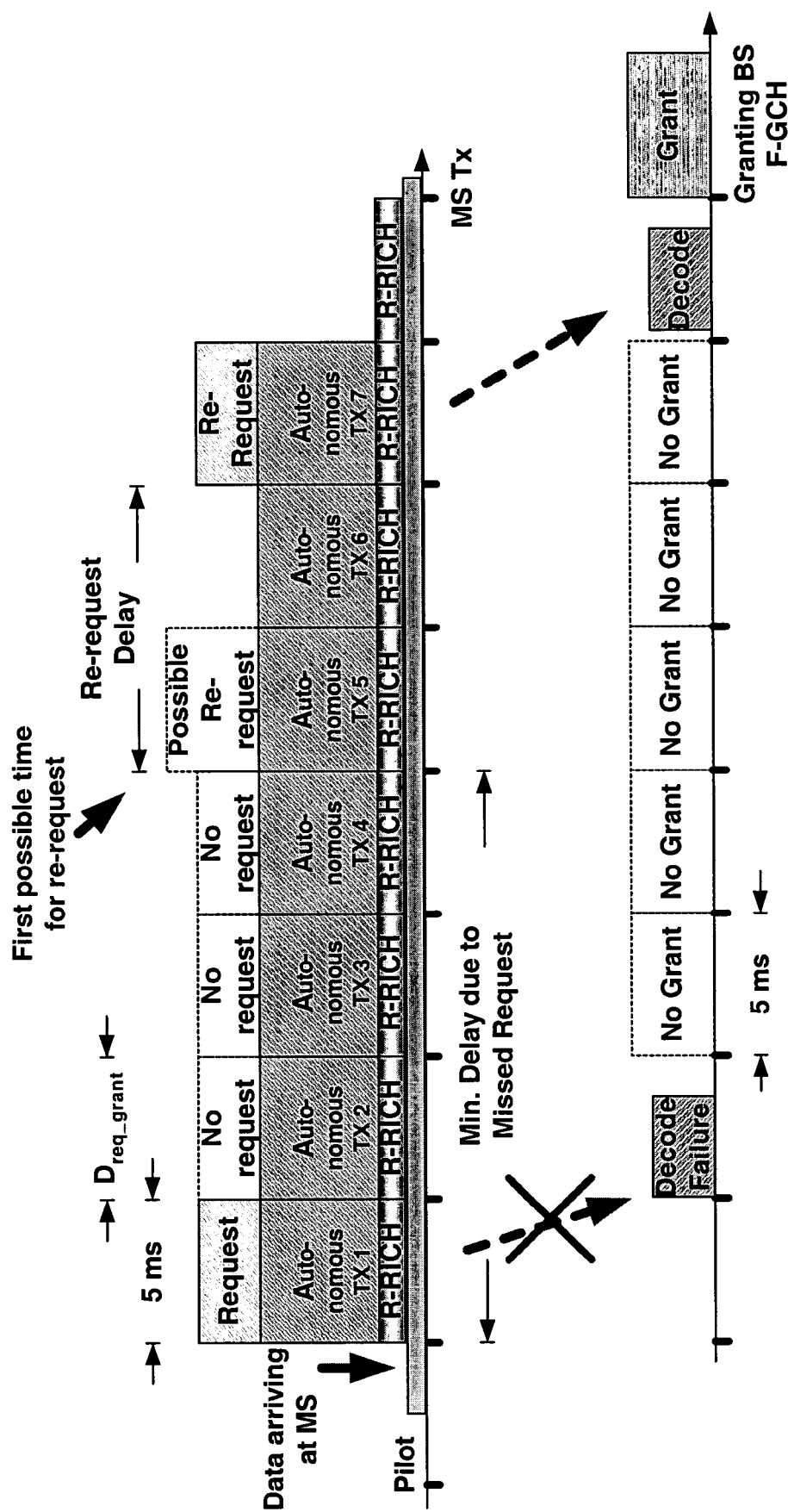
FIG. 13 is a timing diagram illustrating the effect of a missed request.

FIG. 13 is a timing diagram illustrating the effect of a missed request. As before, the mobile station makes a request after data arrives for transmission. The mobile station would expect the soonest grant in response, if any, to arrive at a time $D_{reg\_grant}$ after the request. This would correspond to the frame in which TX 3 is transmitted, as shown. However, the request is not received at the base station for some reason, as indicated by the decode failure. Therefore, no grant is made, as indicated by the dashed outline on the granting base station F-GCH. If a grant had been made, the mobile station would have used the fourth frame to decode it. In this case, no grant is made, so no grant is decoded. Therefore, it is at the beginning of the fifth frame that the mobile station would first be ready to initiate a new request. Thus, four frames from the beginning of the first request would be the minimum delay for a re-request following a missed request. Note that, accordingly, during the three frames following the request, no request is made, as indicated by the dashed outlines.

The first available frame for re-request is illustrated with a dashed outline labeled "Possible Re-request". However, in this embodiment, the mobile station is equipped to wait an additional re-request delay, as indicated, before transmitting a new request. The delay in this example is two frames. The re-request delay may be used by the base station to reduce the reverse link load created by the repeated requests or to provide QoS differentiation by letting certain classes of mobile stations re-request faster than others. The re-request delay may be signaled to mobile stations. It may be deterministic or probabilistic, i.e., it can be randomized. For example, the mobile station generates a random number each re-request and determines the re-request accordingly. QoS differentiation may be included by biasing the random numbers appropriately to give premium class mobile stations or data types a higher probability of lower re-request delay than economy class mobile stations or data types.

The mobile station, in FIG. 13, sends the re-request as indicated in frame 7, and the granting base station receives and decodes the re-request correctly during frame 8. In response, a grant is issued in the ninth frame. Note that, since the request was missed, there are no grants issued on the F-GCH until frame 9.

Although the example of a missed request is illustrated in FIG. 13, the behavior of the mobile station depicted is identical to the situation in which a mobile station refrains from making any grant, individual or common, to the mobile station. The mobile station does not differentiate between a possible missed grant and a denied grant. The re-request mechanism is deployed to govern the mobile station's re-request.

Note also the impact of a missed request on the granting base station's scheduling. When a request is not received correctly at a granting base station, any subsequent common grant issued by that base station will also grant the mobile station whose request was not decoded correctly. Thus, that mobile station will transmit and use up a portion of the shared resource that was not factored into the base station's allocation. There are several ways to handle this issue. First, the granting base station may simply factor the possible additional mobile station into the next allocation, modifying the T/P of the common grant to accommodate the extra transmission, if necessary. Another alternative, although perhaps prohibitively costly, is for the base station to signal that mobile station with an individual grant indicating an alternate T/P, or with a special flag indicating the mobile station's grant is terminated. However, using an ACK is a more efficient and effective way to remove a grant that was made in error, or is no longer desired. The base station may simply ACK-and-Continue those mobile stations for whom the common grant is desired to remain effective, and ACK those for whom the common grant is to be terminated.

Figure 14:
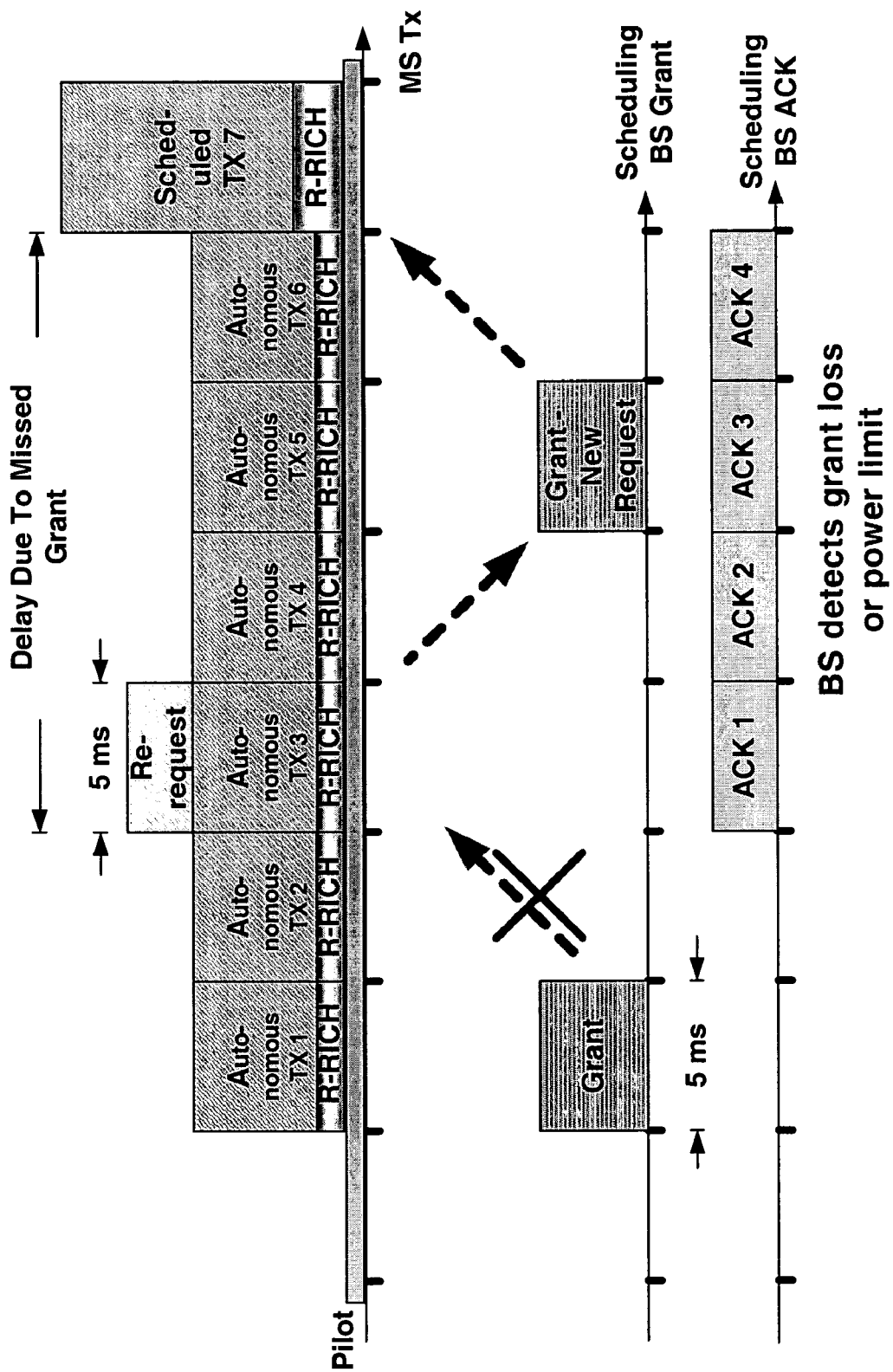
FIG. 14 is a timing diagram illustrating delay caused by a missed grant.

FIG. 14 is a timing diagram illustrating delay caused by a missed grant. In the first frame shown, the mobile station has already issued a request and is transmitting autonomously TX 1. The scheduling base station issues a grant for the mobile station during that same frame. However, the grant is not received correctly, and so, in the following frame, the mobile station does not decode the grant. In the third frame, the mobile station re-requests. At the same time, autonomous transmission TX 3 is sent by the mobile station. However, if the grant had not been missed, it would be in frame 3 that the mobile station could have transmitted a scheduled transmission. Instead, the scheduling base station grants the new request in the fifth frame, which the mobile station receives and decodes correctly in the sixth frame. The mobile station makes a scheduled transmission, TX 7, in the seventh frame. Note the four-frame delay in the scheduled transmission due to the missed grant.

In an example embodiment, the scheduling base station may detect the grant loss when it receives a transmission limited to the autonomous T/P in frame 3. The base station may determine the grant was lost, or the mobile station was otherwise power limited, in contrast to the expected T/P allowed in the missed grant. While it is possible that a mobile station, having received an individual grant with a higher T/P, would transmit at the lower autonomous T/P limit, it may be unlikely, and the base station could take advantage of the detected likely missed grant. In the example shown in FIG. 14, the re-request was made without a re-request delay. Thus, the next frame in the granted ARQ channel, frame 7, will be used for a scheduled transmission, as desired. In an alternate example, not shown, if the mobile station was subject to a re-request delay, the re-request would not have been received by the scheduling base station in frame 4. The scheduling base station would then be able to reallocate the T/P assigned to the mobile station for frame 7 to another mobile station, so that the system resources would not be underutilized.

Figure 15:
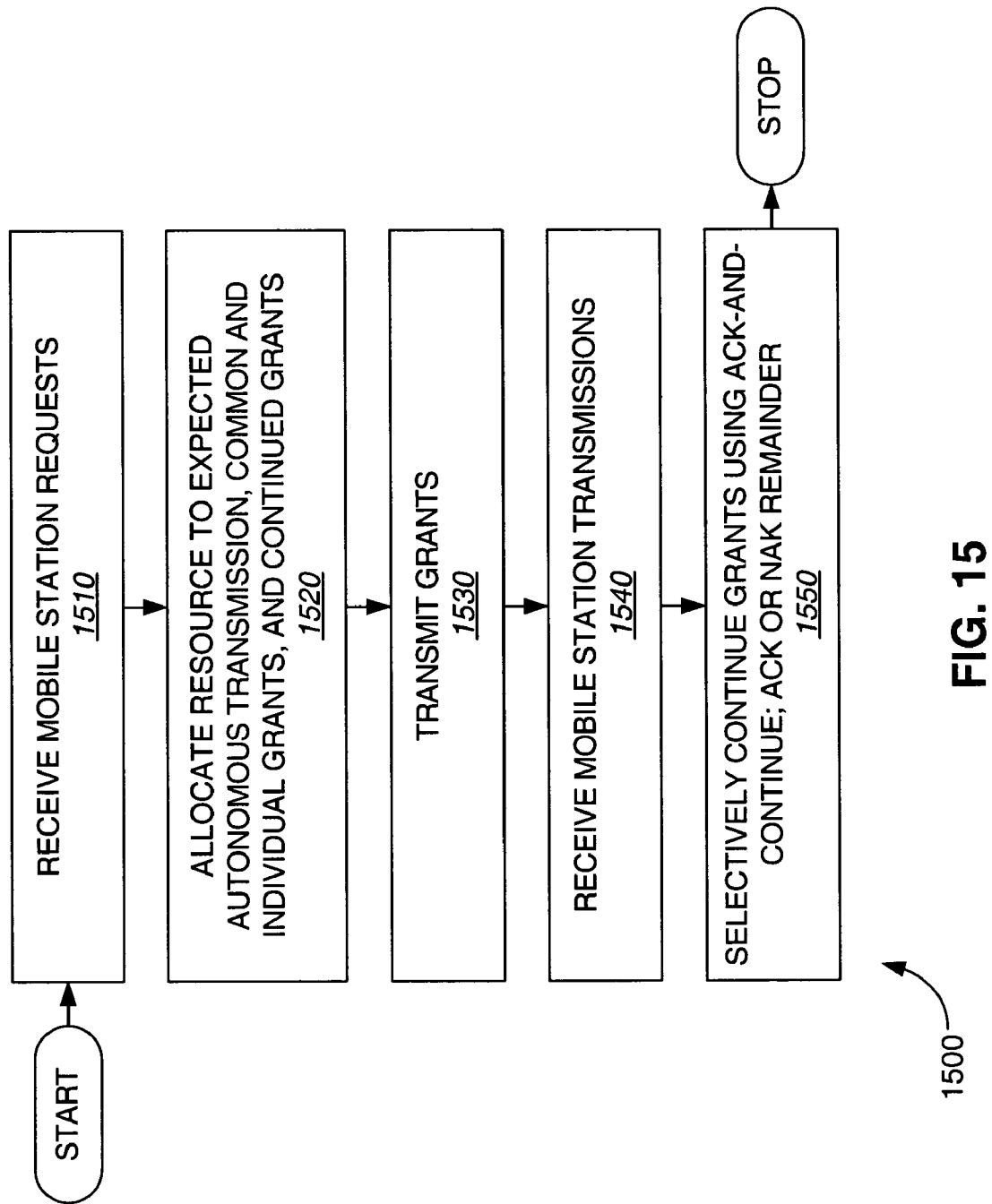
FIG. 15 is a flowchart illustrating a method of scheduling grants and acknowledging transmissions.

FIG. 15 is a flowchart illustrating a method 1500 of scheduling and acknowledging transmissions. In an example embodiment, this method may be iterated indefinitely, repeating the process once for each subpacket frame (5 ms, for example). The process starts in step 1510, where the scheduling base station receives access requests from one or more mobile stations. Note that the scheduling base station may be serving a plurality of mobile stations. A subset of those mobile stations may not have any data to transmit. Another subset may transmit autonomously only. Another subset may send a request for access (along with an autonomous data transmission, if applicable).

In step 1520, the scheduling base station allocates the shared resource to the expected number of autonomous transmissions, one or more individual grants, if any, a common grant for the remainder of the requests, if desired, and any grants that will be extended from previous grants (individual or common). Some mobile stations may not be transmitting at all, and techniques for estimating the number of transmitting base stations are known in the art, including using system statistics, previous transmissions, the type of data previously transmitted, and any number of other factors. A suitable margin to allow for the uncertainty may be included, which may be pre-determined, or dynamically updated as conditions change. The rest of the mobile stations desiring to transmit will be known, with some exceptions, due to the access requests, which may also indicate the amount of data to transmit. The base station may keep track of how much data is left to transmit from each of the requesting mobile stations. One exception may be missed requests, of which the base station will be unaware. As described above, in such a case, the mobile station whose request is missed may yet transmit according to a common grant, if one is issued. The base station may include some margin to allow for such unexpected transmissions. The base station may also abort unexpected transmissions quickly using the ACK command instead of the ACK-and-Continue command. Based on the expected autonomous transmission, and any applicable margins, the base station may allocate the shared resource to the shared and common grants, if any. Again, mobile stations may be selected for increased transmission based on their geometry, with QoS factored in, to increase throughput for a given system load, while maintaining service levels. In the example 1xEV-DV system, the shared resource is the balance of the reverse link not assigned to other channels, as described above. The amount of reverse link capacity for allocation to the R-ESCH may thus vary with time.

In step 1530, the base station transmits the grants. Individual grants may be transmitted on one or more individual grant channels. Mobile stations may be assigned to monitor a grant channel specific to the mobile station, or one or more individual grant channels on which a plurality of mobile stations may be individually granted. In one embodiment, a single common grant channel is used to transmit a common grant. In an alternate embodiment, multiple common grants may be allocated, and transmitted on multiple common grant channels. Mobile stations may be assigned to monitor one or more common grant channels, and the number monitored may be a subset of the total number of common grant channels.

In step 1540, the base station receives data transmissions from the mobile stations. These transmissions will include autonomous transmissions, as well as any transmissions made in response to any individual or common grants. The base station may receive unexpected transmissions. For example, a missed request may result in a mobile station transmitting in response to a common grant. As another example, a mobile station may incorrectly decode an individual grant directed to another mobile station, and transmit according to that individual grant instead of a common grant, or instead of refraining from transmission in the case where no common grant is issued. In yet another example, a mobile station may incorrectly decode an ACK or NAK as an ACK-and-Continue, thus erroneously extending a previous grant or terminating an unfinished transmission and extending a previous grant. The base station decodes each of the received transmissions and determines whether or not the transmissions were decoded in error.

In step 1550, the base station selectively extends previous grants, if the allocation allows, to any number of the previously granted mobile stations. The base station uses the ACK-and-Continue command, thus avoiding the overhead associated with additional requests and grants. Those transmissions received in error will be NAKed, and retransmission will follow if the maximum number of retransmissions (or subpackets) has not been reached. Those mobile stations for which a grant is not to be extended (and whose transmissions were decoded without a detected error) will be transmitted an ACK. The process then stops (and may be repeated for the next frame).

Figure 16:
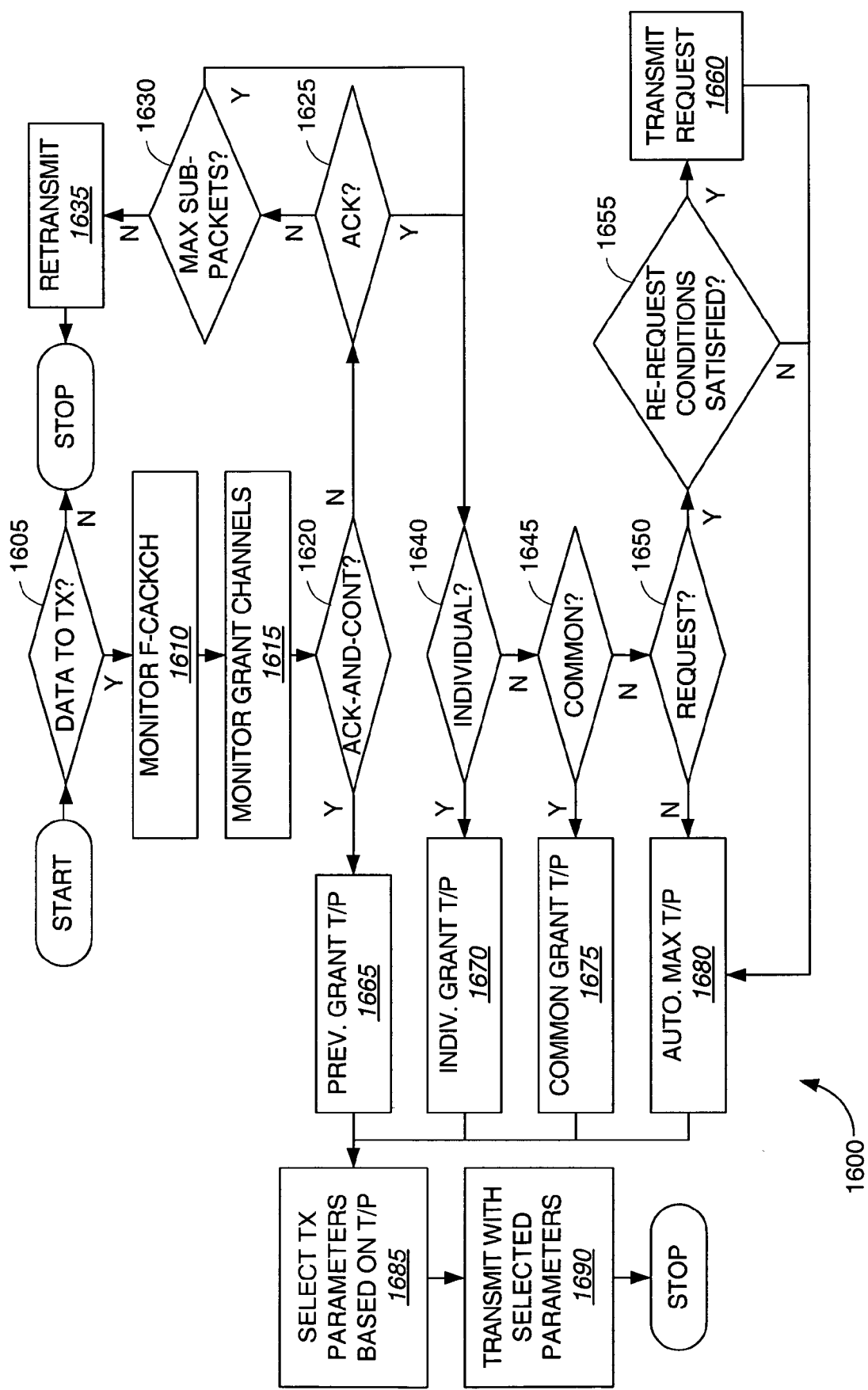
FIG. 16 is a flowchart illustrating a method of making requests, receiving grants and acknowledgements, and corresponding data transmission.

FIG. 16 is a flowchart illustrating a method 1600 of making requests, receiving grants and acknowledgements, and corresponding data transmission. This method is suitable for deployment in a mobile station communicating with a scheduling base station. That base station may be using a method such as method 1500, described above. This process may be iterated for each frame, in similar fashion as method 1500.

The process starts in decision block 1605. If the mobile station does not have data to transmit, the process stops. Data may arrive for transmission in a future iteration. If data is present, i.e. in the data buffer, proceed to step 1610 and/or 1615.

Steps 1610 and 1615 may be carried out simultaneously, or sequentially without respect to order. The functions of monitoring the HARQ channel and grant channels may be interrelated, as depicted in this embodiment, or may be separable. This embodiment illustrates the features of each. Those of skill in the art will readily adopt the principles disclosed herein to myriad alternate embodiments comprising the steps shown or subsets thereof.

In step 1610, the F-CACKCH is monitored for any HARQ commands directed to the mobile station based on a previous transmission. As described above, in this example, a mobile station may receive an ACK, NAK, or ACK-and-Continue (if the previous transmission was in response to a grant). The grant channels assigned to the mobile station for monitoring, which may be a subset of the total number of grant channels, both individual and/or common, are monitored in step 1615 when a previous request from the mobile station has been issued. Naturally, the mobile station need not monitor either the F-CACKCH or the grant channels if neither a prior transmission or prior request was made, respectively.

In decision block 1620, the HARQ portion of the process begins. If there was no previous transmission, the mobile station will not expect any response on the F-CACKCH, and so the process may skip to decision block 1640 (details omitted for clarity). If an ACK-and-Continue command is received in response to a previous transmission (and a previous grant), proceed to step 1665. The mobile station is granted an extended access based on the previous grant, and may use the previously granted T/P. Note that, in alternate embodiments, a change in the common grant may or may not be applicable to change the previous grant T/P, as described above. If an ACK-and-Continue is not received, proceed to decision block 1625.

In decision block 1625, if an ACK is received, a previous grant, if any, is not extended. Neither is retransmission required. The mobile station may yet transmit autonomously, as will be apparent in the rest of the flowchart. In the example embodiment, the remainder of the flowchart dealing with determining if a new grant is issued will not be applicable, as the mobile station will not have an outstanding request (since doing so would use up capacity that the ACK-and-Continue feature was deployed to prevent). However, in alternate embodiments, multiple requests may be allowed to be simultaneously outstanding, perhaps to allow for requests to multiple ARQ channels. These alternates fall within the scope of the present invention, but the details are not shown for the sake of clarity. If an ACK is received, proceed to decision block 1640. Note that decision block 1625 may include a test as to whether a previous transmission was made, and, if not, no ACK (or ACK-and-Continue) would be expected, proceed to decision block 1640.

In decision block 1625, if an ACK is not received, then a NAK is assumed by default. Proceed to decision block 1630. In decision block 1630, if the maximum number of subpackets has been transmitted, no retransmission is allowed. Proceed to decision block 1640 to test for any incoming grants, or to autonomously transmit, as will be described below. If subpackets remain, proceed to step 1635 and retransmit according to the previous transmission, whether autonomous or scheduled. Then the process may stop for the current frame.

Decision blocks 1640 and 1645 are applicable when a previous request has been made, and a grant of one type or another may be received. If no previous request has been made, the mobile station may proceed directly to decision block 1650 (details omitted for clarity). Note that, in this case, the mobile station needn't have performed step 1615 either. Alternatively, decision blocks 1640 and 1645 may include in the test whether or not a previous request was made, and ignore an individual grant (most likely erroneously decoded) or a common grant (which would not be valid for a non-requesting mobile station).

In decision block 1640, if an individual grant is received in response to a previous request, proceed to step 1670. The mobile station is granted a T/P as specified in the individual grant. If not, proceed to decision block 1645.

In decision block 1645, if a common grant is received in response to a previous request, proceed to step 1675. The mobile station is granted a T/P as specified in the common grant. If not, proceed to decision block 1650.

In decision block 1650, the mobile station determines whether or not it wishes to make a request. Various factors, detailed above, may be included in the decision. For example, there may be a minimum amount of data required to make a request worthwhile. The amount of data awaiting transmission should exceed that which can be transmitted autonomously. Further, if subsequent autonomous transmissions would exhaust the data faster than waiting for a request and grant, then a request need not be made. Quality of service may be incorporated in the decision. The mobile station may determine a request is in order for certain types of data, but that autonomous transmission is suitable for others. Or, the mobile station may be limited in its ability to make requests based on the QoS level of the mobile station. Various other examples are detailed above, and others will be apparent to those of skill in the art. Note that the decision to transmit a request can be done for data buffers with different QoS levels or groups of such data buffers to tailor the quality and delay provided to these data buffers. If a request is desired, proceed to decision block 1655. If not, proceed to step 1680. The mobile station (unless otherwise limited) may make an autonomous transmission, using the T/P specified as the maximum autonomous T/P.

In decision block 1655, if a previous request has been made, any re-request conditions must be satisfied (examples detailed above with respect to FIG. 13). The previous request may have been missed, or intentionally not granted based on the base station's allocation process. Or, a previous request may have been individually or commonly granted, and then terminated with an ACK (or failed to be extended with an ACK-and-Continue). In any case, if the re-request conditions applicable are not satisfied, proceed to step 1680 to use the autonomous T/P, as just described. If the re-request conditions are satisfied, proceed to step 1660 and transmit the request. In the example embodiment, the request includes the amount of data in the buffer, and the supportable T/P by the mobile station (which may vary over time). A grant made in response to the request, if any, will come in a later frame, and hence a subsequent iteration of this process 1600. In the example embodiment, the mobile station may immediately make an autonomous transmission, and so proceed to step 1680, as just described.

Figure 17:
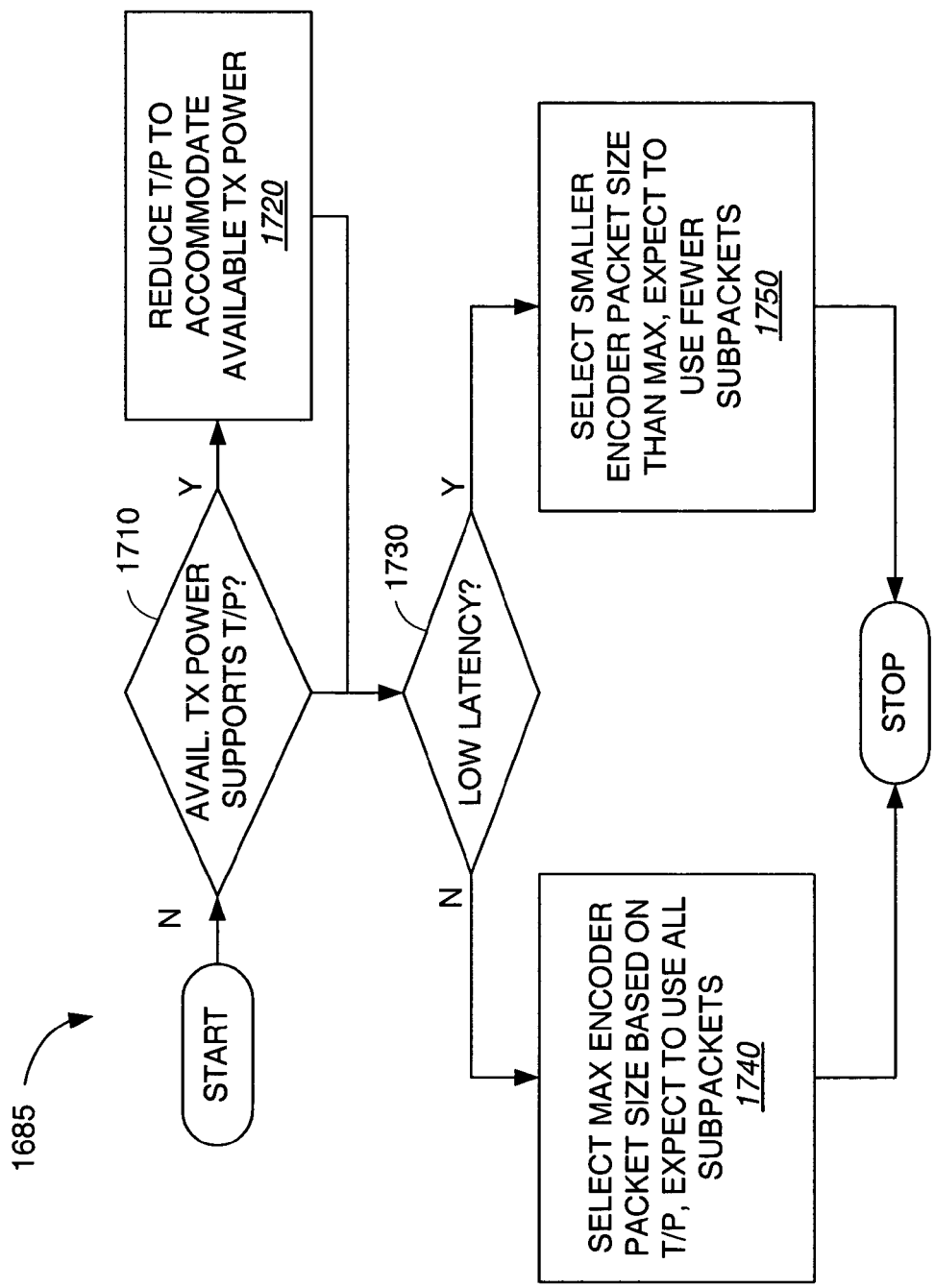
FIG. 17 is a flowchart illustrating a method of selecting transmission parameters in response to an available T/P.

Steps 1665–1680 each assign a T/P for the mobile station to use while transmitting. From any of those steps, proceed to step 1685. In step 1685, the mobile station selects transmission parameters based on the assigned T/P. Note that T/P is used as an example only. Other system allocation parameters may be deployed in alternate embodiments. For example, other power values may be used that allow the mobile station to select transmission parameters. Alternatively, less flexibility may be afforded to the mobile station, and one or more of the transmission parameters may be specifically assigned (whether in a grant, or signaled for use in autonomous transmission). Various methods for selecting transmission parameters are known in the art. Other novel methods have been described above. FIG. 17, detailed below, details an example method for performing step 1685, as well as alternatives. Once the transmission parameters have been selected, proceed to step 1690.

In step 1690, the mobile station transmits an amount of data compatible with and in accordance with the selected parameters. The parameters may include encoder packet size, modulation format, power level for traffic and/or pilots (including primary, secondary, or additional pilots), and any other transmission parameters known in the art. In the example embodiment, for an individual grant, a subpacket is transmitted on an ARQ channel. If a long grant flag is deployed, and included in the individual grant, the mobile station may transmit on more than one ARQ channel. In the example embodiment, a common grant is valid for 20 ms, or 4 ARQ channels. A commonly granted mobile station may use all of them. This method is suitable for use with multiple subpackets and ARQ channels, as detailed herein, although the details are omitted in FIG. 16. These are examples only, and those of skill in the art will readily extend these principles to myriad embodiment configurations. After transmission, the process then stops for the current frame.

FIG. 17 is a flowchart illustrating a method of selecting transmission parameters in response to an available T/P. It is suitable for use in step 1685, detailed above, as well as any other embodiment in which transmission parameters are selected based on T/P. The process begins in decision block 1710. A T/P is assigned for the mobile station's use. If the mobile station's available transmit power is insufficient to utilize the T/P assigned, proceed to step 1720 to reduce the T/P to accommodate the available transmit power.

In the example embodiment, a T/P is assigned. The P parameter is associated with the pilot power, which is power-controlled by the base station. Depending on the rate and format selected, additional pilot power may be needed. In this example, additional pilot power is transmitted on a secondary pilot channel, the R-RICH in this case. The mobile station may want to include a margin, since the future direction of the power control commands are unknown, and may require additional pilot power. The mobile station determines its available transmit power and compares it with the sum of the pilot power (primary and secondary), traffic power, and any margin that is appropriate, to determine if the T/P granted (or assigned to autonomous transmission) can be supported. The T/P, modified as necessary, will be used to select transmission parameters. Proceed to decision block 1730.

Decision block 1730 is an example of the flexibility that may be afforded to a mobile station. A single decision is used in this example for clarity, although additional levels may be introduced, as will be apparent to those of skill in the art. In this case, a decision is made whether maximum throughput or low latency is desired. If low latency is desired, proceed to step 1750. If maximum throughput is desired, proceed to step 1740.

In either case, a set of available parameters is defined. In this example, the parameters detailed in Table 1 are used. Myriad combinations of parameters may be deployed. The system may update parameters as desired through signaling. QoS may be factored in to limit the choices a mobile has to a subset of the total set of parameter combinations. For example, an economy mobile station or data type may have a maximum T/P, regardless of the granted T/P (the scheduling base station may also limit the grant as such). Or an economy mobile station may be forced to always select maximum throughput. In some cases, additional flexibility loosens the tight control the scheduling base station has on the reverse link channel. By limiting the flexibility, additional capacity may be achieved. Thus, limiting flexibility to economy mobile stations or data types may be appropriate.

In step 1740, the mobile station desires maximum throughput, and so selects the maximum encoder size allowed by the T/P, assuming the maximum number of subpackets, and the expectation that all subpackets will need to be transmitted, on average. In Table 1, this corresponds to limiting the rows to those designated as having four 5 ms slots. There is one such row for each encoder packet size. The encoder packet size is then selected, indexed by the T/P value. The remainder of the parameters, such as repetition factor, modulation format, Walsh channel selection, code rate, and so forth, are given in the appropriate row. Those of skill in the art will readily extend this to myriad sets of channel parameters, in addition to those shown in Table 1.

In step 1750, lower latency is desired, so fewer than the maximum number of subpackets are selected for the expected number of subpacket retransmissions (the actual number of retransmissions will vary, depending on the channel conditions, probability of error, etc.). For the lowest latency possible, the mobile station may select a row such that the expectation (to within a desired probability) is of successful transmission in a single subpacket. Of course, if the data to be transmitted does not fit in a single subpacket, given the available T/P, actual latency may be reduced by selecting a row with more than one subpacket (i.e. 2 or 3). Note that the base station may be able to reallocate subpackets not used by the mobile station (i.e. a decision is made to use fewer than the maximum). In the example embodiment, the T/P grant is made assuming the mobile station has the right to use all the subpackets. If an earlier subpacket is received correctly, the base station may ACK-and-Continue (if additional data is awaiting transmission), or reallocate the subsequent ARQ channel slots to a different mobile station. Again, too much latitude afforded to the mobile station may result in less tight control over the RoT, and thus potential throughput losses. Those of skill in the art will fine tune the flexibility for the desired system performance.

Various methods for selecting the row from a table of possible combinations will be apparent to those of skill in the art, in light of the teachings herein. One example is to order the table based on the required T/P for each combination of data rate (and other parameters) and expected number of subpackets. The mobile station would then choose the combination with the features desired (latency, throughput, etc.) from the subset supportable by the given T/P. Or, more simply, the T/P may be an index to a specific row. The indexed row may be updated through signaling. If additional flexibility is desired, the number of subpackets chosen may be indexed for the given T/P. Certain data types, such as FTP, for example, may always select the maximum throughput option (i.e. maximum encoder packet size with largest expected number of subpacket retransmissions).

Again, this example is described using the example T/P system allocation parameter. Alternate embodiments may use an alternate parameter, or may specifically direct one or more of the parameters for use by the mobile station. From either step 1740 or 1750, once the parameters have been selected, the process may stop.

It should be noted that in all the embodiments described above, method steps can be interchanged without departing from the scope of the invention. The descriptions disclosed herein have in many cases referred to signals, parameters, and procedures associated with the 1xEV-DV standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station, comprising:
   a data buffer for receiving data for transmission;
   a message generator for generating an access request message when the data buffer contains data for transmission;
   a receiver for receiving one or more individual grant channels and one or more common grant channels from a base station;
   a message decoder for decoding an access grant directed to the remote station, the access grant comprising an individual grant directed on one of the one or more individual grant channels or a common grant on one of the one or more common grant channels; and
   a transmitter for transmitting the access request message and for transmitting a portion of data from the data buffer in response to a decoded access grant, wherein the transmitter further transmits a limited portion of the data in the data buffer autonomously, irrespective of whether an access grant has been received.

2. A remote station, comprising:
   a data buffer for receiving data for transmission;
   a message generator for generating an access request message when the data buffer contains data for transmission;
   a receiver for receiving one or more individual grant channels and one or more common grant channels from a base station;
   a message decoder for decoding an access grant directed to the remote station, the access grant comprising an individual grant directed on one of the one or more individual grant channels or a common grant on one of the one or more common grant channels; and
   a transmitter for transmitting the access request message and for transmitting a portion of data from the data buffer in response to a decoded access grant, wherein the transmitter transmits on one of a plurality of channels subsequent to a received grant.

3. The remote station of claim 2, wherein the transmitter transmits on two or more of a plurality of channels subsequent to a received grant.

4. The remote station of claim 3, wherein the received grant is an individual grant, comprising a long grant flag, the long grant flag asserted.

5. The remote station of claim 3, wherein the received grant is a common grant.

6. A remote station, comprising:
   a data buffer for receiving data for transmission;

a message generator for generating an access request message when the data buffer contains data for transmission;

a receiver for receiving one or more individual grant channels and one or more common grant channels from a base station;

a message decoder for decoding an access grant directed to the remote station, the access grant comprising an individual grant directed on one of the one or more individual grant channels or a common grant on one of the one or more common grant channels; and a transmitter for transmitting the access request message and for transmitting a portion of data from the data buffer in response to a decoded access grant, wherein a grant comprises a T/P value.

7. The remote station of claim 6, further comprising a processor for selecting transmission parameters based on a T/P value.

8. The remote station of claim 7, wherein the transmission parameters comprise an encoder packet size.

9. The remote station of claim 7, wherein the transmission parameters comprise an expected number of subpacket transmissions.

10. The remote station of claim 9, wherein the number of expected subpacket transmissions selected is the maximum number of subpacket transmissions.

11. The remote station of claim 9, wherein the number of expected subpacket transmissions selected is less than the maximum number of subpacket transmissions.

12. The remote station of claim 7, wherein the transmission parameters comprise a modulation format.

13. The remote station of claim 7, wherein the transmission parameters comprise a transmit power level for a secondary pilot channel.

14. The remote station of claim 7, wherein the processor reduces the T/P when the transmitter has insufficient transmit power to transmit according to the unreduced T/P.

15. A remote station, comprising:
a data buffer for receiving data for transmission;
a message generator for generating an access request message when the data buffer contains data for transmission;
a receiver for receiving one or more individual grant channels and one or more common grant channels from a base station;
a message decoder for decoding an access grant directed to the remote station, the access grant comprising an individual grant directed on one of the one or more individual grant channels or a common grant on one of the one or more common grant channels; and
a transmitter for transmitting the access request message and for transmitting a portion of data from the data buffer in response to a decoded access grant, wherein:
the receiver further receives an ACK-and-Continue command; and
the transmitter transmits an additional portion of data from the data buffer in response to a previously decoded access grant.

16. A remote station, comprising:
a data buffer for receiving data for transmission;
a message generator for generating an access request message when the data buffer contains data for transmission;
a receiver for receiving one or more individual grant channels and one or more common grant channels from a base station;
a message decoder for decoding an access grant directed to the remote station, the access grant comprising an individual grant directed on one of the one or more individual grant channels or a common grant on one of the one or more common grant channels; and
a transmitter for transmitting the access request message and for transmitting a portion of data from the data buffer in response to a decoded access grant, wherein:
the receiver further receives an ACK command; and
the transmitter ceases transmitting data from the data buffer in response to a previously decoded access grant.

17. The remote station of claim 16, wherein the transmitter further transmits a limited portion of the data in the data buffer autonomously, subsequent to a received ACK.

18. A remote station, comprising:
a data buffer for receiving data for transmission;
a message generator for generating an access request message when the data buffer contains data for transmission;
a receiver for receiving one or more individual grant channels and one or more common grant channels from a base station;
a message decoder for decoding an access grant directed to the remote station, the access grant comprising an individual grant directed on one of the one or more individual grant channels or a common grant on one of the one or more common grant channels; and
a transmitter for transmitting the access request message and for transmitting a portion of data from the data buffer in response to a decoded access grant, wherein:
the receiver further receives a NAK command; and
the transmitter retransmits the portion of data from the data buffer previously transmitted in response to a previously decoded access grant.

19. A remote station, comprising:
a data buffer for receiving data for transmission;
a message generator for generating an access request message when the data buffer contains data for transmission;
a receiver for receiving one or more individual grant channels and one or more common grant channels from a base station;
a message decoder for decoding an access grant directed to the remote station, the access grant comprising an individual grant directed on one of the one or more individual grant channels or a common grant on one of the one or more common grant channels; and
a transmitter for transmitting the access request message and for transmitting a portion of data from the data buffer in response to a decoded access grant, wherein the message generator generates an access request message conditioned on the amount of data in the data buffer exceeding a pre-determined threshold.

20. A remote station, comprising:
a data buffer for receiving data for transmission;
a message generator for generating an access request message when the data buffer contains data for transmission;
a receiver for receiving one or more individual grant channels and one or more common grant channels from a base station;
a message decoder for decoding an access grant directed to the remote station, the access grant comprising an individual grant directed on one of the one or more individual grant channels or a common grant on one of the one or more common grant channels; and a transmitter for transmitting the access request message and for transmitting a portion of data from the data buffer in response to a decoded access grant, wherein the message generator generates an access request message conditioned on a Quality of Service (QoS) service level.

21. A remote station, comprising:

a data buffer for receiving data for transmission;

a message generator for generating an access request message when the data buffer contains data for transmission;

a receiver for receiving one or more individual grant channels and one or more common grant channels from a base station;

a message decoder for decoding an access grant directed to the remote station, the access grant comprising an individual grant directed on one of the one or more individual grant channels or a common grant on one of the one or more common grant channels; and a transmitter for transmitting the access request message and for transmitting a portion of data from the data buffer in response to a decoded access grant, wherein the message generator generates an access request message conditioned on re-request conditions being satisfied with respect to a previously generated access request message.

22. A remote station, comprising:

a data buffer for receiving data for transmission;

a message generator for generating an access request message when the data buffer contains data for transmission;

a receiver for receiving one or more individual grant channels and one or more common grant channels from a base station;

a message decoder for decoding an access grant directed to the remote station, the access grant comprising an individual grant directed on one of the one or more individual grant channels or a common grant on one of the one or more common grant channels; and a transmitter for transmitting the access request message and for transmitting a portion of data from the data buffer in response to a decoded access grant, wherein the message generator generates an access request message conditioned on desired data transmission latency.

23. A remote station, comprising:

a data buffer for receiving data for transmission;

a message generator for generating an access request message when the data buffer contains data for transmission;

a receiver for receiving one or more individual grant channels and one or more common grant channels from a base station;

a message decoder for decoding an access grant directed to the remote station, the access grant comprising an individual grant directed on one of the one or more individual grant channels or a common grant on one of the one or more common grant channels; and a transmitter for transmitting the access request message and for transmitting a portion of data from the data buffer in response to a decoded access grant, wherein the message generator generates an access request message conditioned on desired data transmission throughput.

* * * * *